(12) United States Patent
Overbeck

(10) Patent No.: US 9,373,194 B2
(45) Date of Patent: *Jun. 21, 2016

(54) COMPUTING DEVICES AND METHODS FOR NAVIGATING AROUND A SURFACE OF THREE-DIMENSIONAL (3D) COORDINATE SYSTEM REPRESENTATIONS OF 3D OBJECTS

(71) Applicant: Google Inc., Mountain View, CA (US)

(72) Inventor: Ryan Styles Overbeck, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/740,304

(22) Filed: Jun. 16, 2015

(65) Prior Publication Data

US 2015/0279100 A1 Oct. 1, 2015

Related U.S. Application Data

(63) Continuation of application No. 13/755,620, filed on Jan. 31, 2013, now Pat. No. 9,070,210.

(51) Int. Cl.
*G06T 15/00* (2011.01)
*G06T 19/00* (2011.01)
*G06T 19/20* (2011.01)
*G06F 3/0481* (2013.01)
*G06F 3/0485* (2013.01)
*G06T 15/20* (2011.01)

(52) U.S. Cl.
CPC .......... *G06T 19/003* (2013.01); *G06F 3/0485* (2013.01); *G06F 3/04815* (2013.01); *G06T 15/20* (2013.01); *G06T 19/20* (2013.01); *G06T 2219/2016* (2013.01)

(58) Field of Classification Search
CPC . G06T 15/00; G06T 19/00; G06T 2219/2016; G06T 19/003; G06T 15/20; G06F 3/0485; G06F 3/04815
USPC .................................................. 345/418, 419
See application file for complete search history.

(56) References Cited

U.S. PATENT DOCUMENTS

| | | | |
|---|---|---|---|
| 5,452,216 A | 9/1995 | Mounce | |
| 6,308,134 B1 | 10/2001 | Croyle et al. | |
| 7,737,965 B2 | 6/2010 | Alter et al. | |
| 7,907,774 B2 | 3/2011 | Parr et al. | |
| 9,070,210 B1 * | 6/2015 | Overbeck | ................ G06T 19/20 |

OTHER PUBLICATIONS

Abbas, "Spherical Trigonometry and Navigational Calculations", EME College, pp. 1-4, 2011.

* cited by examiner

*Primary Examiner* — Phu K Nguyen
(74) *Attorney, Agent, or Firm* — Dority & Manning, P.A.

(57) ABSTRACT

The present disclosure relates to navigating around geographic maps within a map viewport display. More specifically, the present disclosure relates to navigating around a surface of a 3D, geographic coordinate system representation of a body using a pan feature while North is locked. In response to a user activating a pan feature of a navigation interface, a spin angle and, or a swing angle is calculated and the globe is revolved around a spin-axis and/or a swing-axis while revolution around a rotate-axis is locked.

16 Claims, 20 Drawing Sheets

COMPUTING DEVICES AND METHODS FOR NAVIGATING AROUND A SURFACE OF THREE-DIMENSIONAL (3D) COORDINATE SYSTEM REPRESENTATIONS OF 3D OBJECTS

PRIORITY CLAIM

The present application is a continuation of U.S. application Ser. No. 13/755,620 having a filing date of Jan. 31, 2013. Applicants claim priority to and benefit of all such applications and incorporate all such applications herein by reference.

FIELD OF THE INVENTION

The present disclosure relates to navigating around geographic maps presented within a map viewport display to a user of a mapping application. More specifically, the present disclosure relates to navigating around a surface of a three dimensional (3D), geographic coordinate system, representation of the globe using a pan feature while North is locked.

BACKGROUND

Geographic mapping applications represent some of the most frequently used computer-based applications. The underlying geographic maps often include various features, such as buildings, properties and landmarks in addition to roadways. After launching a mapping application, a navigation interface is used to display a desired view of the associated geographic map within a map viewport.

Navigating around a surface of a three-dimensional, geographic coordinate system, representation of a geographic map of the surface of the Earth presents a plethora of challenges. It is desirable to consistently reposition the geographic map in response to a user activating a navigation interface such that a user is presented with a smooth and predictable transition when moving from a first view to a second view.

SUMMARY

A method of presenting a camera viewpoint of a three-dimensional surface of a body within a two-dimensional map viewport is provided. The display is rendered on a computing device and the body surface is defined by data of a three-dimensional coordinate system having x, y, and z axes. The body includes a North pole and a South pole, a spin-axis that extends through a center of the body generally along the z-axis, and a swing-axis that extends generally along the x-axis through the center of the body perpendicular to the spin-axis and parallel to a plane defined by the viewport. The method includes rendering a display of the body in the viewport using the three-dimensional coordinate system data and causing the rendered body to move within the viewport between a current point ($p_O$) on the body surface and a desired point ($p_T$) on the body surface via an intermediate point ($p_M/p_M'$) using the three-dimensional coordinate system data. Causing the rendered to move includes determining a spin-axis angle of revolution around the spin-axis between the current point and the intermediate point around a first body circle, determining a swing-axis angle of revolution around the swing-axis between the intermediate point and the desired point around a second body circle and moving the rendered body within the viewport along the determined spin-axis angle of revolution and the determined swing-axis angle of revolution. Movement of the body within the viewport between the current point and the desired point does not change an orientation of the North pole of the rendered body within the viewport.

In another embodiment, a computing device having a display configured to present a camera viewpoint of a three-dimensional surface of a body within a two-dimensional viewport is provided. The body surface is rendered on a computing device and the body surface is defined by data of a three-dimensional coordinate system having x, y, and z axes. The body includes a North pole and a South pole, a spin-axis that extends through a center of the body generally along the z-axis, and a swing-axis that extends generally along the x-axis through the center of the body perpendicular to the spin-axis and parallel to a plane defined by the viewport. The computing device includes a cursor control device having a user input mechanism. Activation of the cursor control device and the input mechanism causes a processor to execute a body surface panning module and a display generation module stored on a non-transitory computer readable medium that, when executed by a processor, renders a display of the body in the viewport using the three-dimensional coordinate system data. The body surface panning module stored on a non-transitory computer readable medium that, when executed by a processor, causes the rendered body to move within the viewport between a current point ($p_O$) on the body surface and a desired point ($p_T$) on the body surface via an intermediate point ($p_M/p_M'$) using the three-dimensional coordinate system data. The rendered body is caused to move by determining a spin-axis angle of revolution around the spin-axis between the current point and the intermediate point around a first body circle, determining a swing-axis angle of revolution around the swing-axis between the intermediate point and the desired point around a second body circle and moving the rendered body within the viewport along the determined spin-axis angle of revolution and the determined swing-axis angle of revolution. Movement of the body within the viewport between the current point and the desired point does not change an orientation of the North pole of the rendered body within the viewport.

In a further embodiment, a non-transitory computer-readable medium having instructions stored thereon that are configured to present a camera viewpoint of a three-dimensional surface of a body within a two-dimensional viewport is provided. The body surface is rendered on a computing device and the body surface includes data of a three-dimensional coordinate system having x, y, and z axes. The body includes a North pole and a South pole, a spin-axis that extends through a center of the body along the z-axis between the North pole and the South pole, and a swing-axis that extends along the x-axis through the center of the body perpendicular to the spin-axis and parallel to a plane defined by the viewport. The non-transitory computer-readable medium includes a display generation module that, when executed by a processor, renders a display of the body in the viewport using the three-dimensional coordinate system data, a body surface panning feature module that, when executed by a processor, causes the rendered body to move within the viewport between a current point ($p_O$) on the body surface and a desired point ($p_T$) on the body surface via an intermediate point ($p_M/p_M'$) using the three-dimensional coordinate system data. The body is moved by determining a spin-axis angle of revolution around the spin-axis between the current point and the intermediate point around a first body circle, determining a swing-axis angle of revolution around the swing-axis between the intermediate point and the desired point around a second body circle and moving the rendered body within the viewport along the determined spin-axis angle of revolution and the determined swing-axis angle of revolution. Movement of the body within the viewport between the current point and the desired point does not change an orientation of the North pole of the rendered body within the viewport.

The features and advantages described in this summary and the following detailed description are not all-inclusive. Many additional features and advantages will be apparent to one of ordinary skill in the art in view of the drawings, specification, and claims hereof.

DETAILED DESCRIPTION

Geographic maps based on a two-dimensional (2D) Mercator projection, of the surface of the Earth are widely available. When a 2D Mercator projection of the surface of the Earth is displayed within a map viewport of a computing device, navigation around the map is easily accomplished using a pan function. A pan function may be included within the map viewport by providing, for example, an up-arrow, a down-arrow, a left-arrow and a right-arrow user interface for panning functions. When a user selects any one of the arrows using a cursor control device (e.g., a mouse), the map will move in a corresponding direction within the map viewport. Alternatively, a pan feature may be provided in which the user places the cursor over a first point within the geographic map, selects the first point, and then drags the first point from an original location to a second location. In any event, activation of the pan function within a 2D Mercator projection map of the surface of the Earth does not rotate a globe. In a 2D context, the North-South and East-West orientation of the map remains fixed within the map viewport when the pan function of a navigation interface is activated. In a 3D context, a user can purposefully reorient the North-South and East-West orientation of the map by activating a rotate function of a navigation interface.

Figure 1:
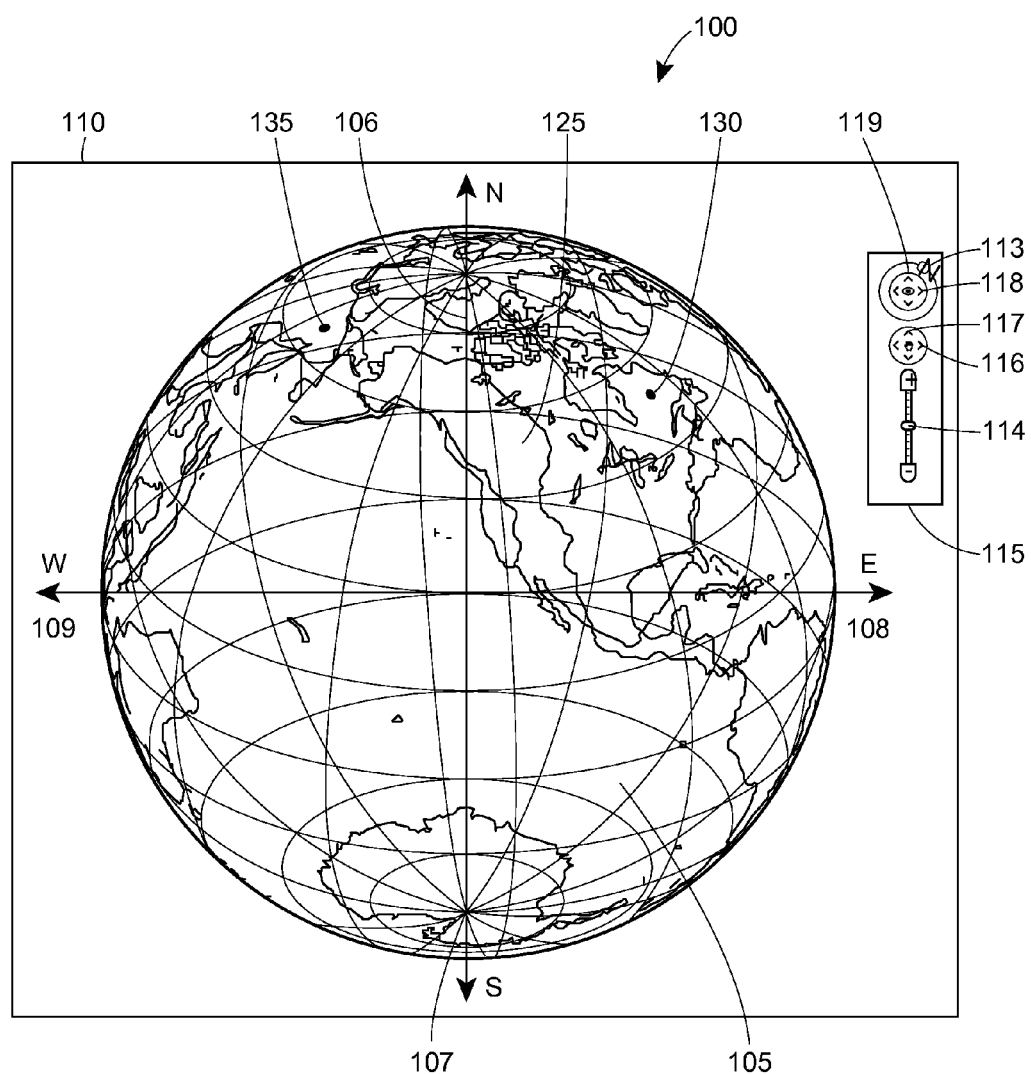
FIG. 1 depicts a camera view of a 3D, geographic coordinate system, representation of a globe within a map viewport along with a navigation interface.

Geographic maps based on a three-dimensional (3D), geographic coordinate system representation of the Earth, as depicted in FIG. 1, are desirable. Navigating around the surface of a 3D, geographic coordinate system representation of the earth using known mapping applications is difficult when compared to navigating around a 2D Mercator projection. In a 3D context, when a user activates a pan function of a corresponding navigation interface, the North-South and East-West orientation (i.e., compass heading) drifts with respect to the original orientation while the map is repositioned from a first view to a second view. Because of this drift, map rotation in response to a user activating a pan function of a navigation interface may be disorienting to the user. Providing navigation within a 3D, geographic coordinate system representation of the Earth that is similar to navigation within a 2D Mercator projection is desirable. As will be described in detail herein, navigation within a 3D, geographic coordinate system representation of the Earth is made similar to navigation within a 2D, Mercator projection of the Earth by locking a compass heading during panning. The compass heading is changed only when the user purposely activates a navigation function (e.g., compass rotation) that is separate from a pan function.

In one embodiment described in detail herein, a spin angle (e.g., spin angle $1023g$ of FIG. 10G) defines a revolution of a globe (e.g., Earth 105 of FIG. 1) around a spin-axis (e.g., spin-axis 210 of FIG. 2) when a horizontal pan feature (e.g., horizontal pan feature 116 of FIG. 1) is activated. A swing angle (e.g., swing angle $1053g$ of FIG. 10G) defines a revolution of the Earth 105 around a swing-axis (e.g., swing-axis 215 of FIG. 2) when a vertical pan feature (e.g., vertical pan feature 117 of FIG. 1) is activated. A rotate angle (e.g., rotate angle 221 of FIG. 2) defines a revolution around a rotate-axis (e.g., rotate-axis 220 of FIG. 2) when a compass heading feature (e.g., compass heading feature 113 of FIG. 1) is activated. The horizontal pan feature 116, the vertical pan feature 117 and the compass heading feature 113 are associated with a navigation interface (e.g., navigation interface 115 of FIG. 1). Because activation of the horizontal pan feature 116 and/or activation of the vertical pan feature 117 does not activate the compass heading feature 117, revolution of an associated globe (e.g., Earth 105 of FIG. 1) around the rotate-axis 220 remains locked (i.e., a North orientation of the Earth 105 is locked) when a user of a corresponding mapping application navigates between a first point (e.g., first point 130 of FIG. 1) and a second point (e.g., second point 135 of FIG. 1). The same panning functionality (i.e., a North orientation of the Earth 105 is locked while panning) may be provided when a user of a corresponding mapping application activates a "point select and drag" pan feature using a pointing device (e.g., a mouse). In any event, activation of the horizontal pan feature 116 and activation of the vertical pan feature 117 are independent of activation of the compass heading rotate feature 113.

FIG. 1 depicts a display 100 having a 3D, geographic coordinate system representation of the Earth 105 and a navigation interface 115 within a map viewport 110. The Earth 105 includes a North pole 106, a South pole 107, an East hemisphere 108 and a West hemisphere 109. While the North pole 106 is oriented toward the top of the map viewport 110 in FIG. 1, the North pole 106 can be reoriented by a user in any direction relative to the map viewport 110 via a compass rotate feature or function (e.g., first compass rotate feature 113) of the navigation interface 115.

The navigation interface 115 may include a first compass rotation feature 113, a zoom feature 114, a horizontal pan feature 116, a vertical pan feature 117, a second compass rotation feature 118 and a tilt feature 119. In one embodiment, a user may position a cursor (not shown in FIG. 1) over a first point 130 using a cursor control device (e.g., a mouse), activate a user input (e.g., a left mouse button), and drag the first point 130 to a second point 135. Alternatively, a user can activate the horizontal pan feature 116 and, or the vertical pan feature 117 to reposition the first point 130 to the second point 135. In either event, the compass rotation features 113, 118 remain locked while the user pans from the first point 130 to the second point 135.

Figure 2:
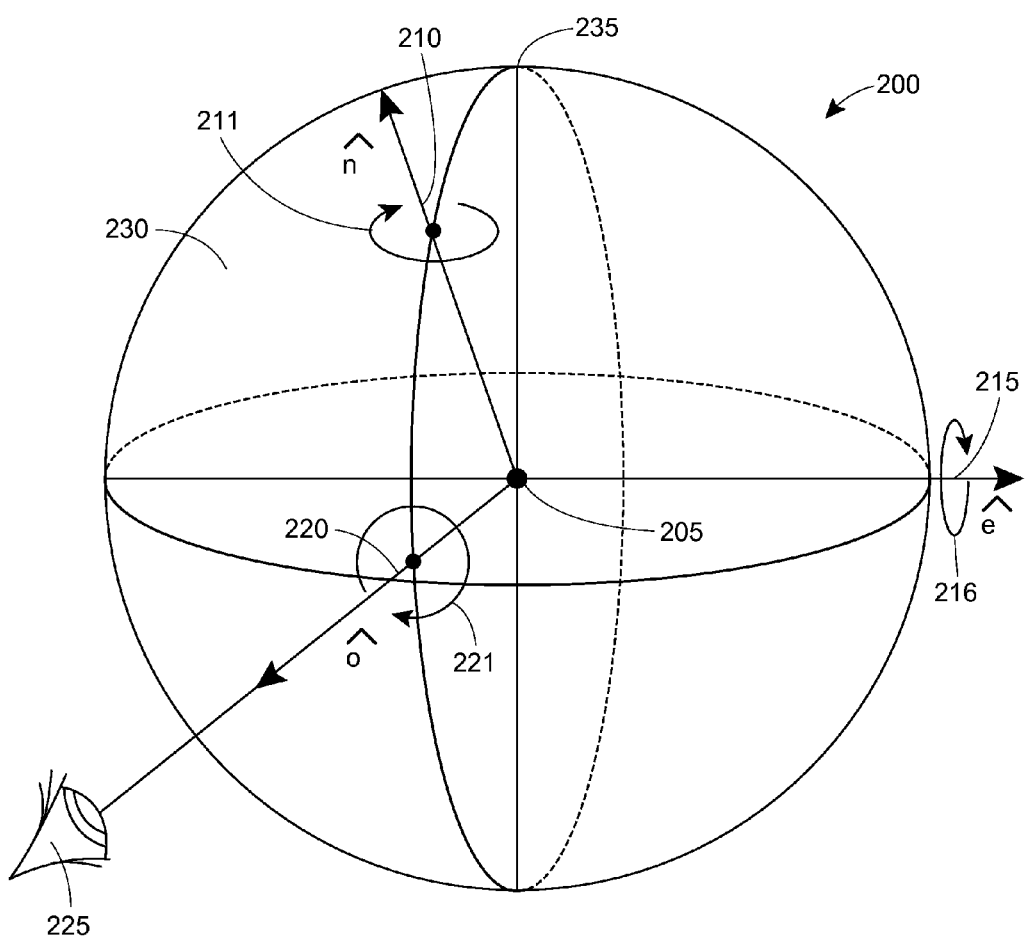
FIG. 2 depicts a sphere used as a geometric representation of the globe of FIG. 1.

In an effort to simplify the ensuing discussion, the Earth 105 of FIG. 1 will be represented by a sphere 200 as depicted in FIG. 2. The center of the sphere 205 may coincide with the center of mass of the Earth 105. The sphere 205 may include a spin-axis 210, a swing-axis 215 and a rotate-axis 220. A camera 225 is depicted relative to the sphere 205 with reference to the rotate-axis 220. The camera 225 is representative of the perspective or viewpoint that a user of a mapping application may have while viewing a geographic map. The camera viewpoint 225 may also correspond to a point on the surface of the sphere where the rotate axis 220 intersects the sphere surface before continuing to the camera viewpoint 225. The rotate axis 220 intersects both the sphere surface and the camera viewpoint. As described in detail herein, panning around a surface 230 of the sphere 200 will entail revolving the sphere 200 around the spin-axis 210, by a spin angle 211, and, or revolving the sphere 200 around the swing-axis 215, by a swing angle 216, while keeping revolution of the sphere 200 around the rotate-axis 220 locked. Determination of the spin angle 211 and the swing angle 216 is described in detail herein. As will become apparent, panning around the surface 230 of the sphere 200 in this manner maintains a consistent North pole 235 orientation of the sphere 200. Re-orientation of the North pole 235 of the sphere 200 is accomplished by revolving the sphere 200 around the rotate-axis 220, by a rotate angle 221, using a compass rotation feature (e.g., either compass rotation feature 113, 118 of FIG. 1).

While the above discussion has generally focused on spherical shaped objects (e.g., a globe and the Earth), the spin angle and swing angle computations described herein may be used in conjunction with display of any 3D objects (i.e., bodies), such as a shoe, a human, a building, a vehicle, etc. In any event, even when the object to be displayed is, itself, not spherically shaped, (x, y, z) coordinates representative of a sphere are used to determine the spin angle and the swing angle as described herein. With respect to non-spherically shaped 3D objects (or "bodies"), the center of mass or barycenter (if the body has uniform density), or the centroid of the non-spherically shaped 3D object may coincide with the same point (e.g., point 205 of FIG. 2) of a corresponding sphere (e.g., sphere 200 of FIG. 2) used to determine an associated spin angle and swing angle. A corresponding radius (e.g., radius 355a) of the sphere (e.g., sphere 300a of FIG. 3) that is used to compute a spin angle and swing angle may represent a distance between the body's centroid (e.g., center of mass of the Earth 105 of FIG. 1) to a starting point (e.g., start point 130 of FIG. 1).

Figure 3A:
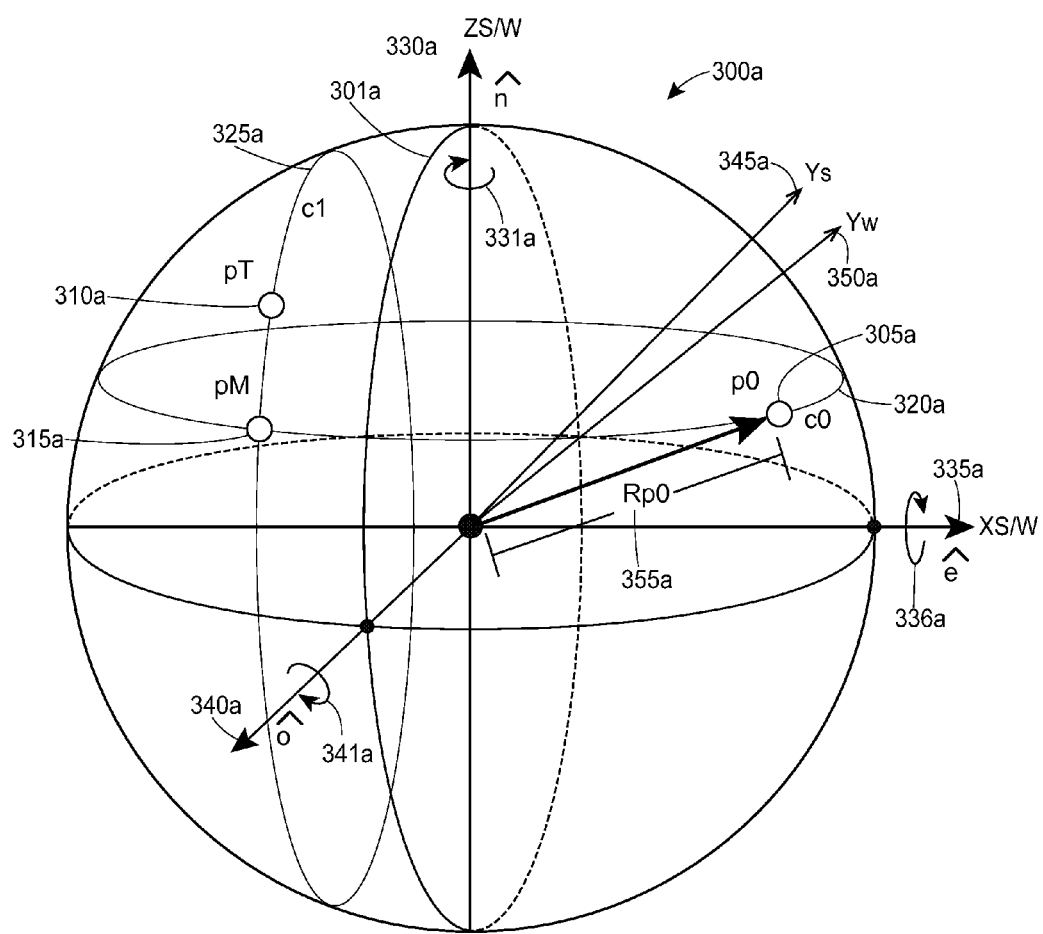
FIGS. 3A-3C each depict a general example of determining a spin angle and a swing angle.
Figure 3B:
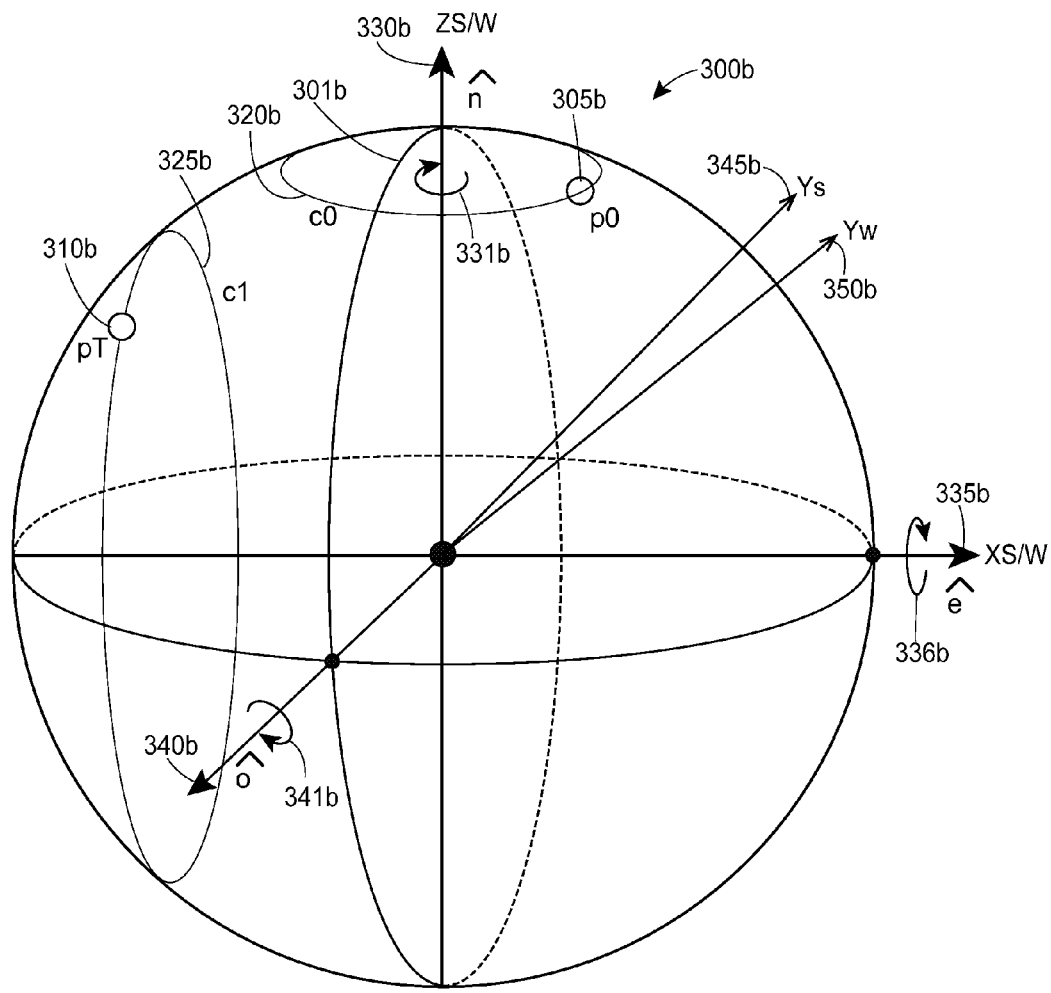
Figure 3C:
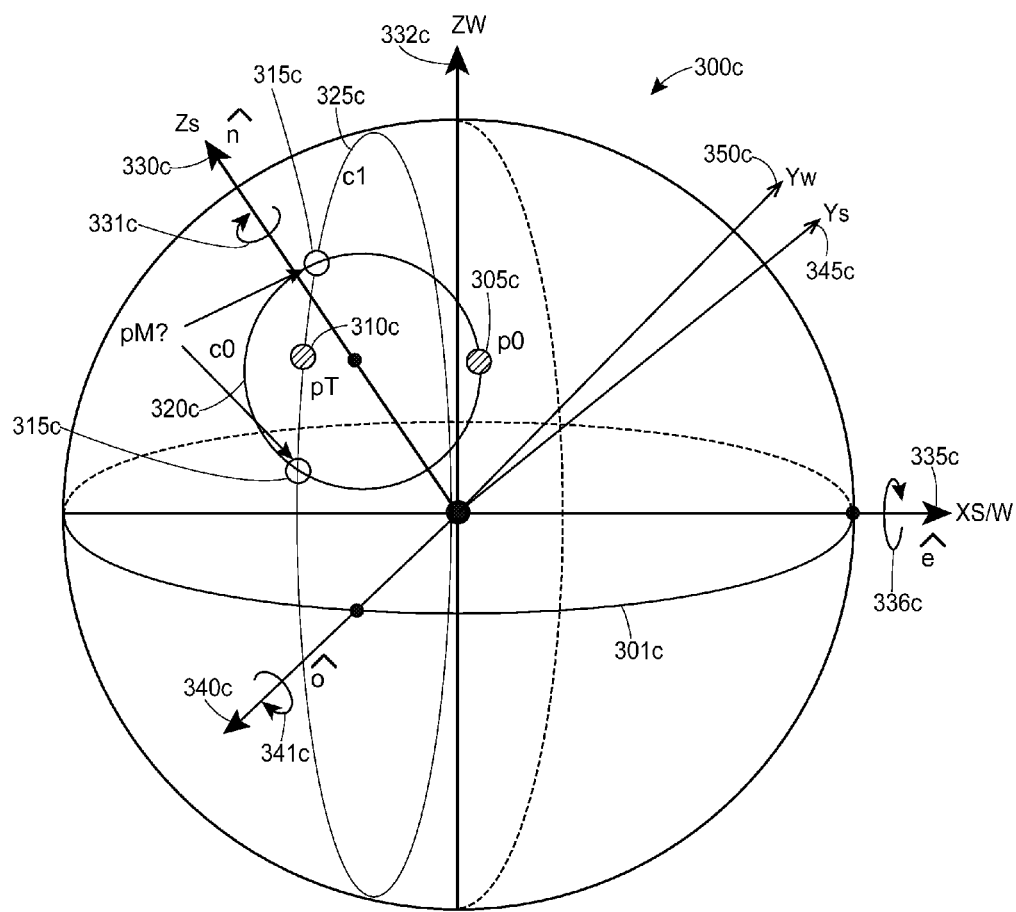

With reference to FIGS. 3A-3C, three different navigation circumstances are illustrated with regard to a 3D, geographic coordinate system, representation of a 3D object (e.g., a globe, the Earth or any other 3D object). FIGS. 3A-C illustrate navigation circumstances in which a user intends to pan between a beginning point (e.g., first point ($p_0$) 305a, 305b, 305c) and an ending point (e.g., second point ($p_T$) 310a, 310b, 310c). As described in detail herein, each of the three navigation circumstances as illustrated by FIGS. 3A-3C may be accomplished using computations that are universally applicable for a spin angle (e.g., spin angle 211 of FIG. 1) and a swing angle (e.g., swing angle 216 of FIG. 1). An alternative set of equations is presented for determination of a swing angle.

Turning to FIG. 3A, a first example of navigating between a first point 305a and a second point ($p_T$) 310a is illustrated. A sphere 300a having a radius ($R_{p_0}$) 355a is depicted in FIG. 3A including a spin-axis ($\hat{n}$) 330a, a swing-axis ($\hat{e}$) 335a and a rotate-axis ($\hat{o}$) 340a. With respect to the 3D object (or "body") to be displayed and navigated, the radius (e.g., radius 355a of FIG. 3A) of a sphere (e.g., sphere 300a of FIG. 3A) used to compute a spin angle and a swing angle may represent a distance between the body's centroid (e.g., center of mass of the Earth 105 of FIG. 1) to a starting point (e.g., start point 130 of FIG. 1). In accordance with the (x, y, z) coordinate assignments described in detail below with respect to the methods 700, 800 and 900 of FIGS. 7-9, respectively, a z-axis ($z_{s/w}$), for determination of both a spin angle 331a and a swing angle 336a, is defined by the spin-axis ($\hat{n}$) 330a. An x-axis ($x_{s/w}$) for determination of both a spin angle 331a and a swing angle 336a is defined by the swing-axis ($\hat{e}$) 335a. A spin y-axis ($y_s$) 345a, for purposes of determining the spin angle 331a, is defined as being perpendicular to both the x-axis and the z-axis and oriented opposite of the rotate-axis (a) 340a. A swing y-axis ($y_w$) 350a, for purposes of determining a swing angle 336a, is defined as being parallel to the rotate-axis ($\hat{n}$) 340a and oriented in the opposite direction relative to the rotate-axis ($\hat{o}$) 340a.

In accordance with the (x, y, z) coordinate projections below with respect to the methods 700, 800 and 900 of FIGS. 7-9, respectively, a first globe circle 320a is defined by rotating the first point 305a in an x-y plane. A second globe circle 325a is defined by rotating the second point 310a in a z-y plane. As can be seen from FIG. 3A, the first globe circle 320a, intersects the second globe circle 325a at an intermediate point 315a. The first globe circle 320a only intersects the second globe circle 325a a single time on the minus y-coordinate half 301a of the sphere 300a. As discussed in detail below in conjunction with derivation of equations 1-12, either equation 3 or 4 from below may be used to compute the spin angle 331a and either equation 7 or 8 or either equation 11 or 12 from below may be used to compute the swing angle 336a. The first point 305a may correspond to the first point 130 of FIG. 1. The second point 310a may correspond to the second point 135 of FIG. 1.

Turning to FIG. 3B, a second example of navigating between a first point 305b and a second point 310b is provided. A sphere 300b is depicted in FIG. 3B including a spin-axis 330b, a swing-axis 335b and a rotate-axis 340b. In accordance with the (x, y, z) coordinate assignments described below with respect to the methods 700, 800 and 900 of FIGS. 7-9, respectively, a z-axis ($z_{s/w}$), for determination of both a spin angle 331b and a swing angle 336b, is defined by the spin-axis 330b and an x-axis ($x_{s/w}$), for determination of both the spin angle 331b and the swing angle 336b, is defined by the swing-axis 335b. A spin y-axis ($y_s$) 345b, for purposes of determining the spin angle 331b, is defined as being perpendicular to both the x-axis and the z-axis and oriented opposite of the rotate-axis 340b. A swing y-axis ($y_w$) 350b, for purposes of determining a swing angle 336b, is defined as being parallel to the rotate-axis 340b and oriented in the opposite direction relative to the rotate-axis 340b.

In accordance with the (x, y, z) coordinate projections below with respect to the methods 700, 800 and 900 of FIGS. 7-9, respectively, a first globe circle 320b is defined by rotating the first point 305b in an x-y plane. A second globe circle 325b is defined by rotating the second point 310b in a z-y plane. As can be seen from FIG. 3B, the first globe circle 320b does not intersect the second globe circle 325b. As discussed in detail below in conjunction with derivation of equations 1-12, either equation 3 or 4 from below may be used to compute the spin angle 331b and either equation 7 or 8 or either equation 11 or 12 may be used to compute the swing angle 336b. The first point 305b may correspond to the first point 130 of FIG. 1. The second point 310b may correspond to the second point 135 of FIG. 1.

Turning to FIG. 3C, a third example of navigating between a first point 305c and a second point 310c is provided. A sphere 300c is depicted in FIG. 3C including a spin-axis 330c, a swing-axis 335c and a rotate-axis 340c. In accordance with the (x, y, z) coordinate assignments described below with respect to the methods 700, 800 and 900 of FIGS. 7-9, respectively, a spin z-axis ($z_s$), for determination of a spin angle 331c, is defined by the spin-axis 330c and an x-axis ($x_{s/w}$), for determination of both a spin angle 331c and a swing angle 336c, is defined by the swing-axis 335c. A spin y-axis ($y_s$) 345c, for purposes of determining the spin angle 331c, is defined as being perpendicular to both the x-axis and the z-axis and oriented opposite of the rotate-axis 340c. A swing y-axis ($y_w$) 350c, for purposes of determining a swing angle 336c, is defined as being parallel to the rotate-axis 340c and oriented in the opposite direction relative to the rotate-axis 340c. A swing z-axis ($z_w$), for determination of a swing angle 336c, is defined as being perpendicular to both the swing y-axis 350c and the x-axis 335c and is oriented upward with respect to the display. The spin z-axis 330c and the swing z-axis 332c are not parallel due to the sphere having been revolved around the rotate-axis 341c by a rotate angle 341c.

In accordance with the (x, y, z) coordinate projections below with respect to the methods 700, 800 and 900 of FIGS. 7-9, respectively, a first globe circle 320c is defined by rotating the first point 305c in an x-y plane. A second globe circle 325c is defined by rotating the second point 310c in a z-y plane. As can be seen from FIG. 3C, the first globe circle 320c intersects the second globe circle 325c twice on the minus y half 301c of the sphere 300c. As discussed in detail below in conjunction of derivation of equations 1-12, either equation 3 or 4 from below may be used to compute the spin angle 331c and either equation 7 or 8 or either equation 11 or 12 may be used to compute the swing angle 336c. The first point 305c may correspond to the first point 130 of FIG. 1. The second point 310c may correspond to the second point 135 of FIG. 1.

Figure 4:
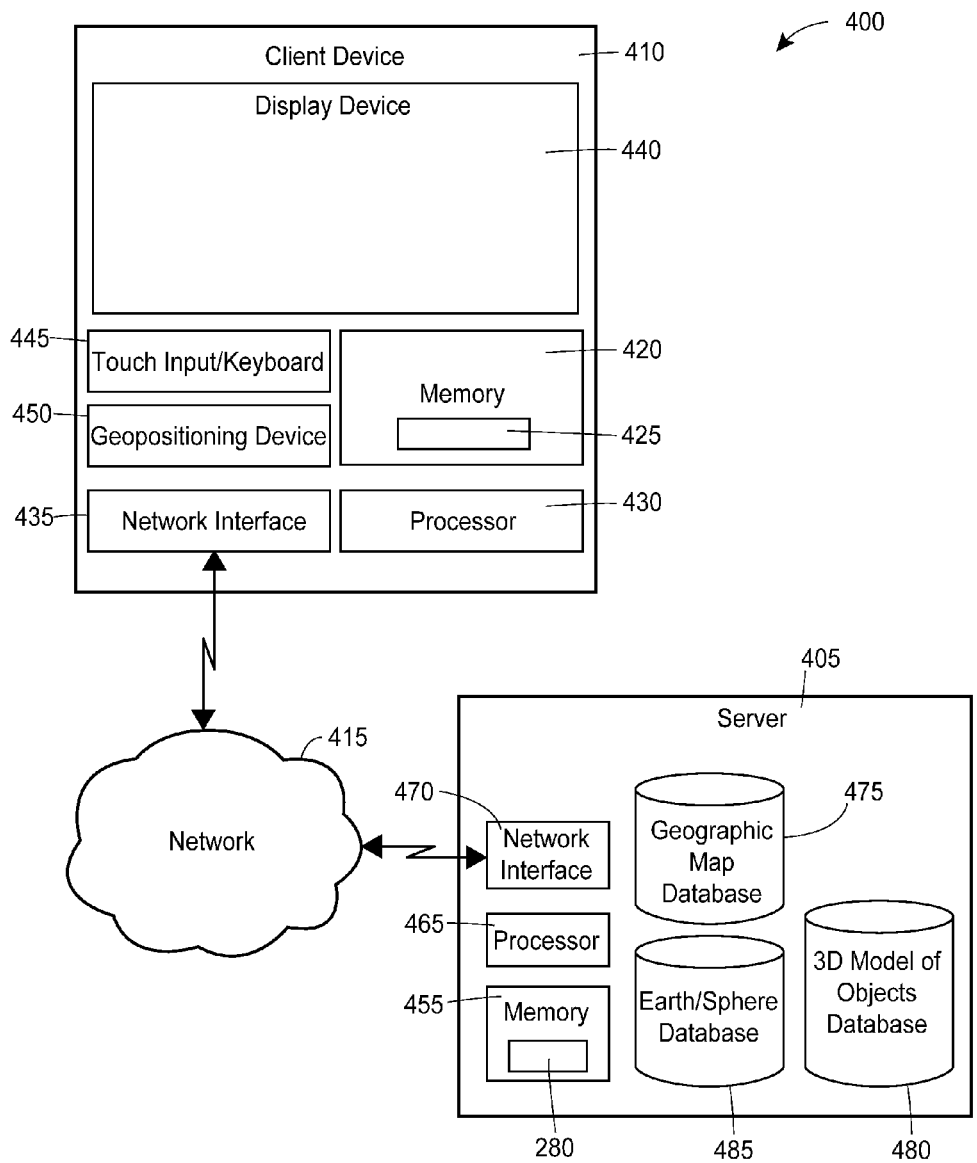
FIG. 4 depicts a high-level block diagram of a computer system for implementing global navigation.

The details associated with a geographic mapping system 400 for navigating around a surface (e.g., surface 125 of FIG. 1) of a 3D, geographic coordinate system, representation of a globe (e.g., the Earth 105) are now described beginning with reference to FIG. 4. FIG. 4 depicts a high-level block diagram of a geographic mapping system 400 that implements communications between client devices 410 and a remote computing device 405 to provide information to a user of the client device 410. A client device 410 is communicatively coupled to the remote computing device 405 via a network 415.

The computing device 405 may include a memory 455 and a processor 465 for storing and executing, respectively, a module 460. The module 460, stored in the memory 455 as a set of computer-readable instructions, facilitates applications related to providing geographic mapping functionality incorporating navigation of a surface of a 3D, geographic coordinate system, representation of the Earth. The module 460 may also facilitate communications between the computing device 405 and the client device 410 via a network interface 470 and the network 415 and other functions and instructions.

The computing device 405 may also include an Earth/sphere database 485 having data representative the Earth and or a sphere representative of the Earth. The computing device 405 may further include a 3D model of objects database 480 having data representative of various objects located on the surface of the Earth, such as buildings, landmarks, natural features, etc. The computing device 405 may also include a geographic map database 475 having data representative of various features located on the surface of the Earth, such as continents, countries, states, counties, cities, roadways, etc. While the Earth/sphere database 485, the 3D model of objects database, 480 and the geographic map database 475 are shown in FIG. 2 as contained within the computing device 405, it should be understood that the Earth/sphere database 485, the 3D model of objects database, 480 and the geographic map database 475 may be located within separate remote servers (or any other suitable computing devices) communicatively coupled to the network 415. Optionally, portions of the Earth/sphere database 485, the 3D model of objects database, 480 and the geographic map database 475 may be stored in memories separate from one another.

For clarity, only one client device 410 is depicted in FIG. 4. While FIG. 4 depicts only one client device 410, it should be understood that any number of client devices 410 may be supported and that each client device 410 may be any appropriate computing device, such as a desk-top computer, a mobile telephone, a personal data assistant, a lap-top computer, a vehicle-based computer system, etc. The client device 410 may include a memory 420 and a processor 430 for storing and executing, respectively, a module 425 that facilitates applications related to providing geographic mapping functionality incorporating navigation of a 3D, geographic coordinate system representation of the Earth. The module 425 may also facilitate communications between the computing device 405 and the client device 410 via a network interface 435 and the network 415 and other functions and instructions. The client device 410 may include a geopositioning device 450, such as a global positioning system receiver or a WiFi positioning device for determining a geographic location of the client device 410. The client device 410 may include a display device 440 which may be any type of electronic display device such as a liquid crystal display (LCD), a light emitting diode (LED) display, a plasma display, a cathode ray tube (CRT) display, or any other type of known or suitable electronic display. The display device 440 may display a map viewport (e.g., the map viewport 100 of FIG. 1, for example) displaying a given geographic area of an overall geographic map at a particular zoom level as specified by a user of the client device 410. The client device 410 may include a user input device 445, such as a touch input/keyboard that provides a mechanism for a user of the client device 410 to enter various information. The user input device 445 may be configured as an integral part of a display device 440, such as a touch screen display device. The network interface 435 may be configured to facilitate communications between the client device 410 and the computing device 405 via any hardwired or wireless communication network (e.g., the network 415), including for example a hardwired Ethernet connection or a wireless LAN, MAN or WAN, WiFi, the Internet, or any combination thereof. Moreover, the client device 410 may be communicatively connected to the computing device 405 via any suitable communication system, such as via any publicly available or privately owned communication network, including those that use wireless communication structures, such as wireless communication networks, including for example, wireless LANs and WANs, satellite and cellular phone communication systems, etc.

Figure 5:
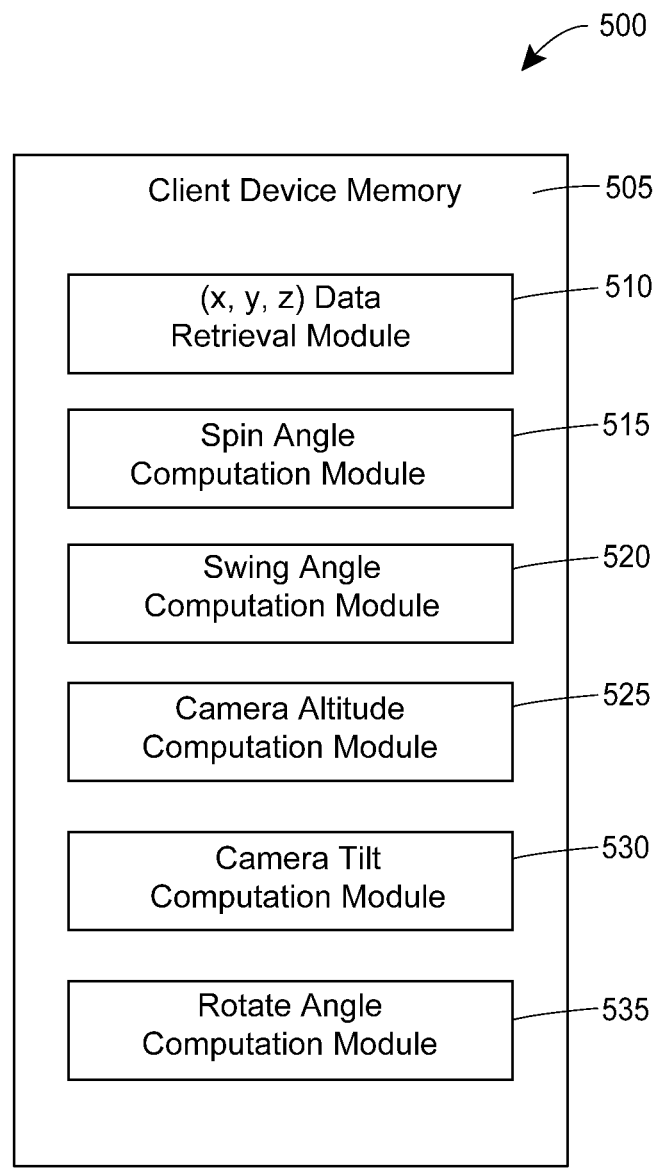
FIG. 5 depicts data structures related to generating a camera view of a globe within a map viewport along with a navigation interface.

Turning now to FIG. 5, a block diagram of a client device 500 is depicted. As described in detail herein, the client device 500 may be suitable for use as a client device 410 of FIG. 4. The client device 410 includes various modules 510, 515, 520, 525, 530 stored on a memory 505. A processor, similar to the processors 430, 465 may execute the modules 510, 515, 520, 525, 530 to navigate around a surface of a 3D, geographic coordinate system, representation of the Earth. Particularly, when a user of a mapping application wants to pan from a first point on the surface of the Earth (e.g., point 130 of FIG. 1) to a second point (e.g., point 135 of FIG. 1), the processor executes at least a portion of the modules 510, 515, 520, 525, 530 in response to the user activating a pan navigation function (e.g., a horizontal pan function 116 and/or a vertical pan function 117 of FIG. 1).

While the modules 510, 515, 520, 525, 530 may be stored on the memory 425 and implemented as a portion of the module 425, it should be understood that the modules 510, 515, 520, 525, 530, or a portion thereof, may be stored on the memory 455 and implemented as at least a portion of the module 460. While modules 510, 515, 520, 525, 530 may be executed by either processor 430, 465, the modules 510, 515, 520, 525, 530 will be described herein as being executed by processor 430.

In any event, the processor 430 may execute an (x, y, z) data retrieval module 510 that accesses an Earth/sphere database (e.g., the database 485) storing data defining a sphere that is representative of the Earth. The processor 430 may also execute a spin angle computation module 515. The spin angle determines the degree to which the sphere will revolve around a spin-axis (e.g., spin-axis 210 of FIG. 2) in response to a user selecting a horizontal pan feature (e.g., horizontal pan feature 116 of FIG. 1). The processor 430 may further execute a swing angle computation module 520. The swing angle determines the degree to which the sphere will revolve around a swing-axis (e.g., swing-axis 215 of FIG. 2) in response to a user selecting a horizontal pan feature (e.g., vertical pan feature 117 of FIG. 1). Computation of both the spin and swing angles are discussed in detail herein with regard to FIGS. 8-10G. The processor 430 may executed both the spin angle computation model 515 and the swing angle computation module 520 (i.e., as a globe surface panning module) in response to a user activating a point-select-and-drag pan feature (i.e., using a mouse).

The processor 430 may execute a camera altitude computation module 525. The processor 430 may execute the camera altitude computation module 525 in conjunction implementation of a panning function, such that a camera altitude is maintained with respect to the surface of the Earth or with respect to objects located on the surface of the Earth. Alternatively, the processor 430 may execute the camera altitude computation module 525 in response to a user selecting a zoom function (e.g., zoom function 114 of FIG. 1). Computation of a camera altitude is described in detail herein with regard to FIG. 12.

The processor 430 may further execute a camera tilt computation module 530 in response to a user selecting a tilt feature (e.g., tilt feature 119 of FIG. 1). The processor 430 may execute the camera tilt computation module 530 in conjunction with executing the spin angle computation module 515 and/or the swing angle computation module 520 such that a camera view point on the surface of the Earth will remain fixed while the camera tilt angle changes. (i.e., the Earth rotates while the camera tilts). Rotating the Earth while tilting the camera results in viewing objects on the surface of the Earth from different perspectives, such as from the top, plan view of the object or a side/top perspective view of the object. Computation of the tilt angle is described in detail herein with regard to FIG. 13.

The processor 430 may also execute a rotate angle computation module 535. The rotate angle determines the degree to which the sphere will revolve around a rotate-axis (e.g. rotate-axis 220 of FIG. 2) in response to a user selecting a compass rotation feature (e.g., compass rotation feature 113, 118 of FIG. 1).

Figure 6:
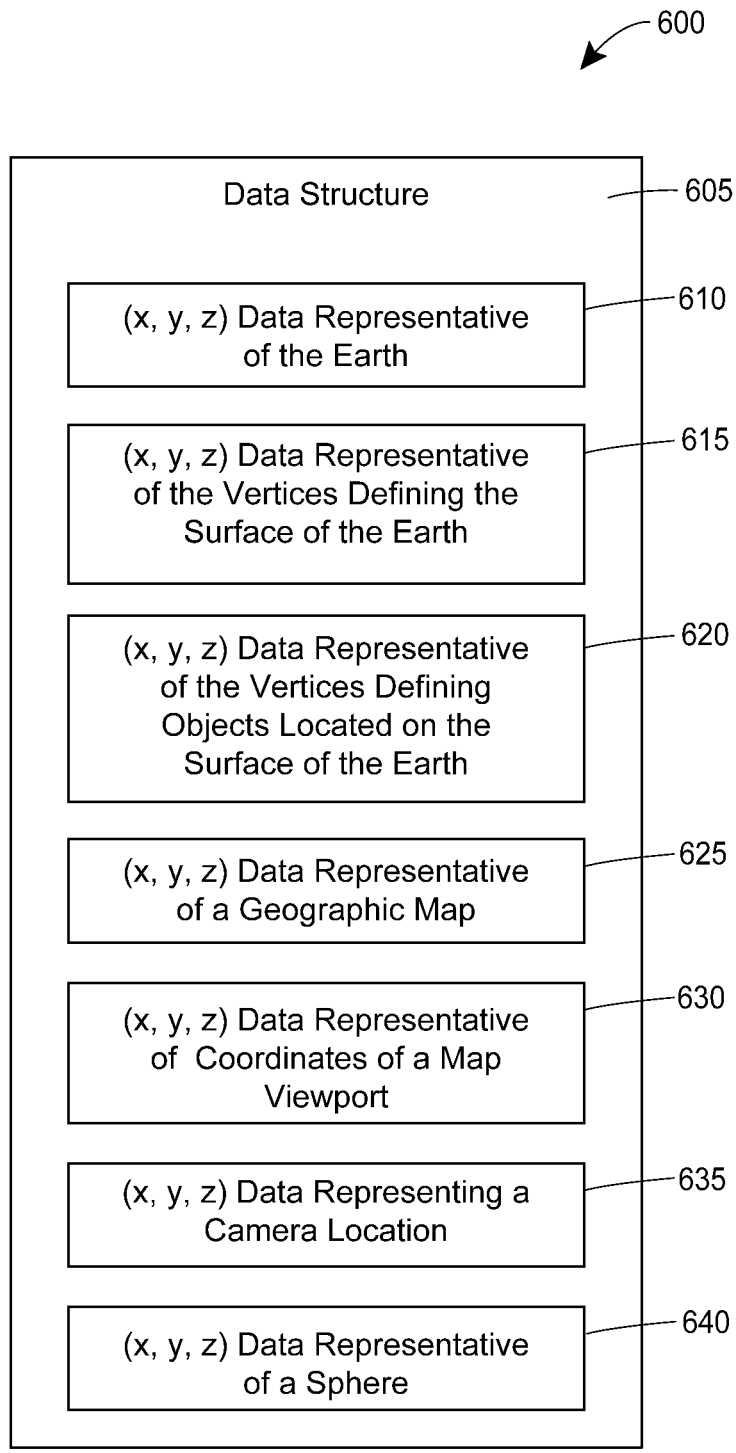
FIG. 6 depicts a block diagram of a computing device including various modules for implementing global navigation.

FIG. 6 depicts a data structure 600 that may be retrieved when the processor 430 executes an (x, y, z) data retrieval module (e.g., (x, y, z) data retrieval module 510 of FIG. 5). The data structure 600 may include (x, y, z) data representative of the Earth 610. The (x, y, z) data representative of the Earth 610 may define a center of mass of the Earth, a North pole of the Earth, a spin-axis of the Earth (e.g., spin axis—210 of FIG. 2), a swing-axis of the Earth (e.g., swing-axis 215 of FIG. 2), a rotate-axis of the Earth (e.g., rotate-axis 220 of FIG. 2), a surface of the Earth and a radius of the Earth.

The data structure 600 may also include (x, y, z) data representative of vertices defining a surface of the Earth 615. The (x, y, z) data representative of vertices defining a surface of the Earth 615 may define the terrain of the land surface of the Earth, an average surface of bodies of water and the underwater terrain of the Earth.

The data structure 600 may further include (x, y, z) data representative of vertices of objects located on the surface of the Earth 620. The (x, y, z) data representative of vertices of objects located on the surface of the Earth 620 may define objects, such as buildings, landmarks, monuments, etc.

The data structure 600 may also include (x, y, z) data representative of a geographic map 625. The (x, y, z) data representative of a geographic map 625 may define roadways, bridges, paths, sidewalks, tunnels, railroads, etc.

The data structure 600 may further include (x, y) data representative of a map viewport 630. The (x, y) data representative of a map viewport 630 may define the relationship between the (x, y, z) data representative of the Earth 610, the (x, y, z) data representative of vertices defining a surface of the Earth 615, the (x, y, z) data representative of vertices of objects located on the surface of the Earth 620 and the (x, y, z) data representative of a geographic map 625 when this data is used to generate a display within a map viewport (e.g., display 100 of FIG. 1).

The data structure 600 may also include (x, y, z) data representative of a camera location 635. The (x, y, z) data representative of a camera location 635 may define a view of a display (e.g., display 100 of FIG. 1). For example, the camera location may define a zoom level and a perspective from which the surface of the Earth and objects located on the surface of the Earth are viewed.

The data structure 600 may further include (x, y, z) data representative of a sphere 640. The (x, y, z) data representative of a sphere 640 may define a geometric relationship between the (x, y, z) data representative of the Earth 610 and the mathematical equations described herein to compute a spin angle and a swing angle, for example. While data structure 600 is described in conjunction with the Earth (e.g., data 610 of FIG. 6), the (x, y, z) data (e.g., data 610 of FIG. 6) may be representative of any 3D object (i.e., body), such as a shoe, a human, a building, a vehicle, etc. In any event, (x, y, z) coordinate data representative of a sphere will be used to compute a corresponding spin angle or swing angle.

Figure 7:
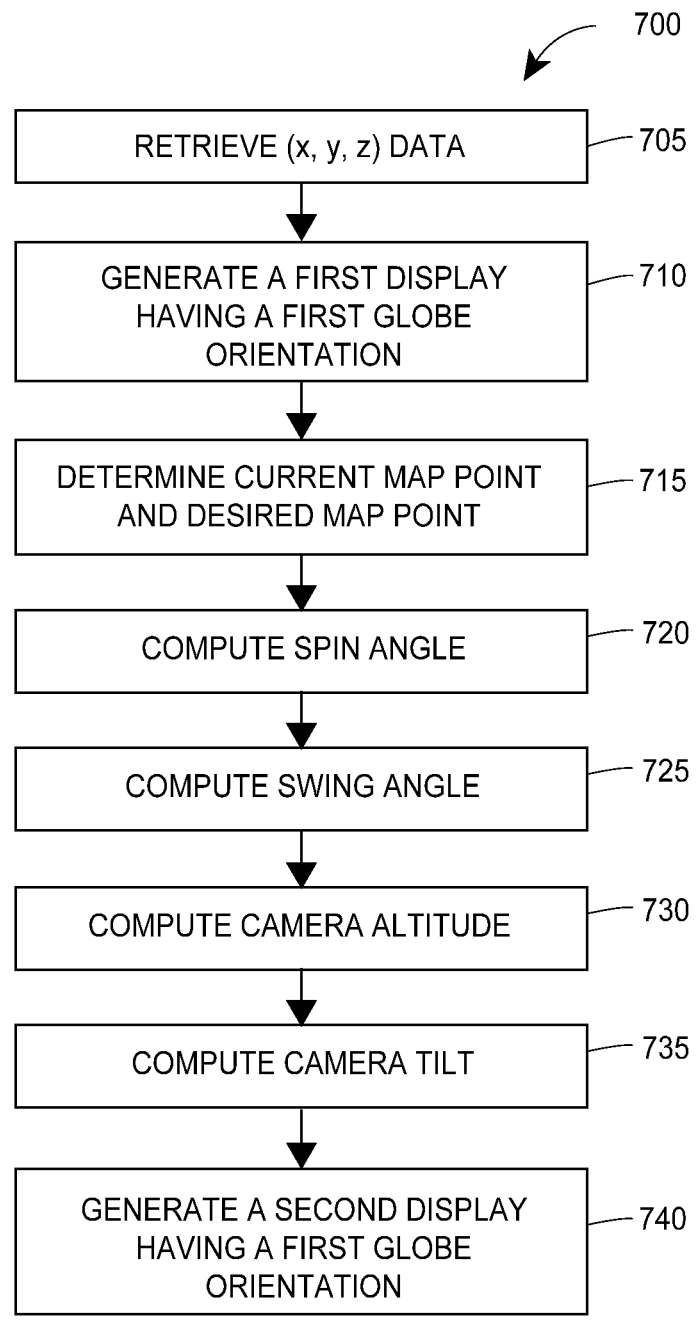
FIG. 7 depicts a flow diagram for a method of generating a camera view of a globe.

With reference now to FIG. 7, a flow diagram depicts a method 700 of navigating around a surface of a 3D, geographic coordinate system, representation of the Earth. The method 700 may be implemented within any suitable computing device, such as either of the client devices 410, 500 of FIG. 4 and FIG. 5, respectively or computing device 405 of FIG. 4. It should be understood that the modules 425, 460 of FIG. 4 or the modules 510, 515, 520, 525, 530 of FIG. 5 may be executed by a processor, similar to processors 430, 465, to implement the method 700. While the modules 510, 515, 520, 525, 530 may be executed by either processor 430, 465 to implement the method 700, execution by the processor 430 will be described herein.

The processor 430, implementing the method 700, retrieves (x, y, z) data (e.g., data structure 600 of FIG. 6) from a database (e.g., Earth/sphere database 485, geographic map database 475 and 3D model of objects database 480 of FIG. 4) (block 705). The processor 430 may generate a display (e.g., display 100 of FIG. 1) based on the retrieved (x, y, z) data (block 710). The processor 430 may determine a current map point (e.g., first point 130 of FIG. 1) on the surface of the globe and a desired map point (e.g., second point 135 of FIG. 1) (block 715) on the surface of the globe in response to a user of a mapping application activating a panning feature of a navigation interface (e.g., horizontal pan feature 116 and, or vertical pan feature 117 of FIG. 1).

The processor 430 may compute a spin angle (block 720) based on the retrieved (x, y, z) data (block 705) and in response to a user of a mapping application activating a panning feature of a navigation interface (e.g., horizontal pan feature 116 and, or vertical pan feature 117 of FIG. 1). Generally, the processor 430 may compute a spin angle (e.g., spin angle 1023g of FIG. 10G) using the following equations:

$$p'_M = \left[ \frac{\sqrt{p_{ox}^2 + p_{oy}^2}}{\sqrt{p_{Tx}^2 + p_{Ty}^2}} \cdot p_{Ty},\ \frac{\sqrt{p_{ox}^2 + p_{oy}^2}}{\sqrt{p_{Tx}^2 + p_{Ty}^2}} \cdot p_{Ty},\ p_{0z} \right]$$ Equation 1

$$\theta_s = \frac{1}{\sqrt{p_{ox}^2 + p_{oy}^2} \cdot \sqrt{p_{Tx}^2 + p_{Ty}^2}} [p_{0x}, p_{0y}, 0] \times [p_{Tx}, p_{Ty}, 0]$$ Equation 2

Where: X is a cross product operator
If: $\theta_s \geq 0$, $s$(the spin angle)$=\sin^{-1}\|\theta_s\|$ Equation 3:

else, $s$(the spin angle)$=-\sin^{-1}\|\theta_s\|$ Equation 4:

Note: The x, y and z axes are as defined with regard to FIGS. 3A-3C.

The individual vectors (e.g., $p_M'$, $P_T$ and $p_0$) may, individually, represent a column of a matrix. The individual (x, y, z) coordinate values (e.g., $p_{Mx}'$, $p_{My}'$ and $p_{Mz}'$), collectively, may represent the given vector $p_M$. The individual (x, y, z) coordinate values (e.g., $P_{Tx}$, $P_{Ty}$ and $P_{Tz}$), collectively, may represent the given vector $P_T$. The individual (x, y, z) coordinate values (e.g., $p_{0x}$, $p_{0y}$ and $p_{0z}$), collectively, may represent the given vector $p_0$. This labeling convention is used throughout this specification. Individual row, column and two dimensional matrixes described herein may conform to this labeling convention.

The processor 430 may compute a swing angle (block 725) based on the retrieved (x, y, z) data (block 705) and in response to a user of a mapping application activating a panning feature of a navigation interface (e.g., horizontal pan feature 116 and, or vertical pan feature 117 of FIG. 1). Generally, the processor 430 may compute a swing angle (e.g., swing angle 1053g of FIG. 10G) using the following equations:

$$p'_T = \left[ p'_{My},\ \frac{\sqrt{p_{My'}^2 + p_{My'}^2}}{\sqrt{p_{Ty}^2 + p_{Tz}^2}} \cdot p_{Ty},\ \frac{\sqrt{p_{My'}^2 + p_{My'}^2}}{\sqrt{p_{Ty}^2 + p_{Tz}^2}} \cdot p_{Tz} \right]$$ Equation 5

$$\theta_w = \frac{1}{\sqrt{p_{My'}^2 + p_{My'}^2} \cdot \sqrt{p_{Ty}^2 + p_{Tz}^2}} [0, p'_{My}, p'_{Mz}] \times [0, p_{Ty}, p_{Tz}]$$ Equation 6

Where: X is a cross product operator.
If: $\theta_w \geq 0$, $w$(the swing angle)$=\sin^{-1}\|\theta_w\|$ Equation 7:

else:

$w$(the swing angle)$=-\sin^{-1}\|\theta_w\|$ Equation 8:

Note: The x, y and z axes are as defined with regard to FIGS. 3A-3C.

As an alternative, the processor 430 may compute a swing angle (e.g., swing angle 1053g of FIG. 10G) using the following equations:

$$R_{c1} = \sqrt{p_{My}^{1} + p_{Mz}^{1}}$$ Equation 9:

If: Rc1−pTz2<0 then: $p_T' = [p_{Mx}', 0, R_{s1}]$ else: $p'_T = \left[ p'_{Mx},\ \sqrt{R_{c1}^2 + p_{Tz}^2},\ p_{Tz} \right]$ Equation 10

$$\theta_w = \frac{1}{R_{c1}^z} [0, p'_{My}, p'_{Mz}] \times [0, p'_{Ty}, p'_{Tz}]$$

Where: X is a cross product operator
If $\theta w \geq 0$, $w$(the swing angle)$=\sin^{-1}\|\theta_w\|$ Equation 11:

else:

$w$(the swing angle)$=-\sin^{-1}\|\theta_w\|$ Equation 12:

Note: The "if" branch determines which direction to rotate and the x, y and z axes are as defined with regard to FIGS. 3A-3C.

As an alternative to a user activating a panning function (e.g., horizontal panning feature 116 or vertical panning feature 117 of FIG. 1) of a navigation interface (e.g., navigation interface 115 of FIG. 1), the processor 430 may retrieve the (x, y, z) data (block 705), determine a current map point and a desire map point (block 715), compute a spin angle (block 720) and compute a swing angle (block 725) in response to a user selecting a first point (e.g., first point 130 of FIG. 1) with a user input device (e.g., a mouse) and dragging the first point to a second point (e.g., second point 135 of FIG. 1). In either event, the processor 430 may generate a second display (block 740) reflecting the fact that the globe has been moved from the first point 130 to the second point 135.

The processor 430 may compute a camera altitude (block 730) based on the retrieved (x, y, z) data (block 705). The processor 430 may compute a camera altitude (block 730) in response to a user activating a pan feature (e.g., horizontal pan feature 116 and, or vertical pan feature 117 of FIG. 1 or "point drag" using a mouse) or in response to a user activating a zoom feature (e.g., zoom feature 114 of FIG. 1). The processor 430 may generate a second display (block 740) reflecting the fact that a camera altitude has been computed.

The processor 430 may compute a camera tilt angle (block 735) in response to a user activating a tilt feature (e.g., tilt feature 119 of FIG. 1). The processor 430 may compute the camera tilt (block 735) in conjunction with computing the spin angle (block 720) and, or computing the swing angle (block 725) such that a camera view point on the surface of the Earth will remain fixed while the camera tilt angle changes. (i.e., the Earth rotates while the camera tilts). Rotating the Earth while tilting the camera results in viewing objects on the surface of the Earth from different perspectives, such as from the top, plan view of the object or a side/top perspective view of the object. Computation of the tilt angle is described in detail herein with regard to FIG. 12. The processor 430 may generate a second display (block 740) reflecting the fact that a camera tilt angle has been computed.

Figure 8:
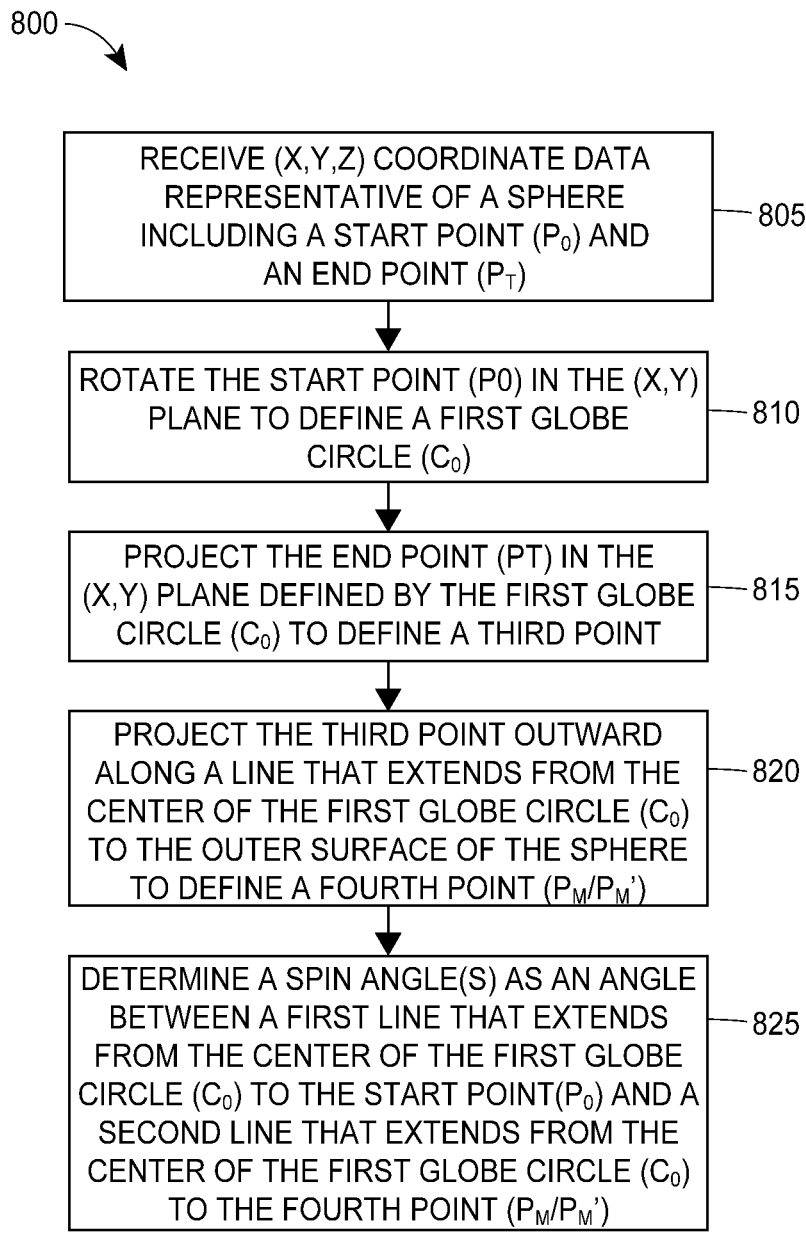
FIG. 8 depicts a flow diagram for a method of calculating a spin angle for revolving a sphere around a spin-axis.

Turning now to FIG. 8, a flow diagram depicts a method 800 of computing a spin angle. The method 800 may be implemented within any suitable computing device, such as either of the client devices 410, 500 of FIG. 4 and FIG. 5, respectively or computing device 405 of FIG. 4. It should be understood that the modules 425, 460 of FIG. 4 or the module 515 of FIG. 5 may be executed by a processor, similar to processors 430, 465, to implement the method 800. While the module 515 may be executed by either processor 430, 465 to implement the method 800, execution by the processor 430 will be described herein. The method 800 of computing a spin angle will be described in conjunction with FIGS. 3A-3C and 10A-10C where appropriate.

Figure 9:
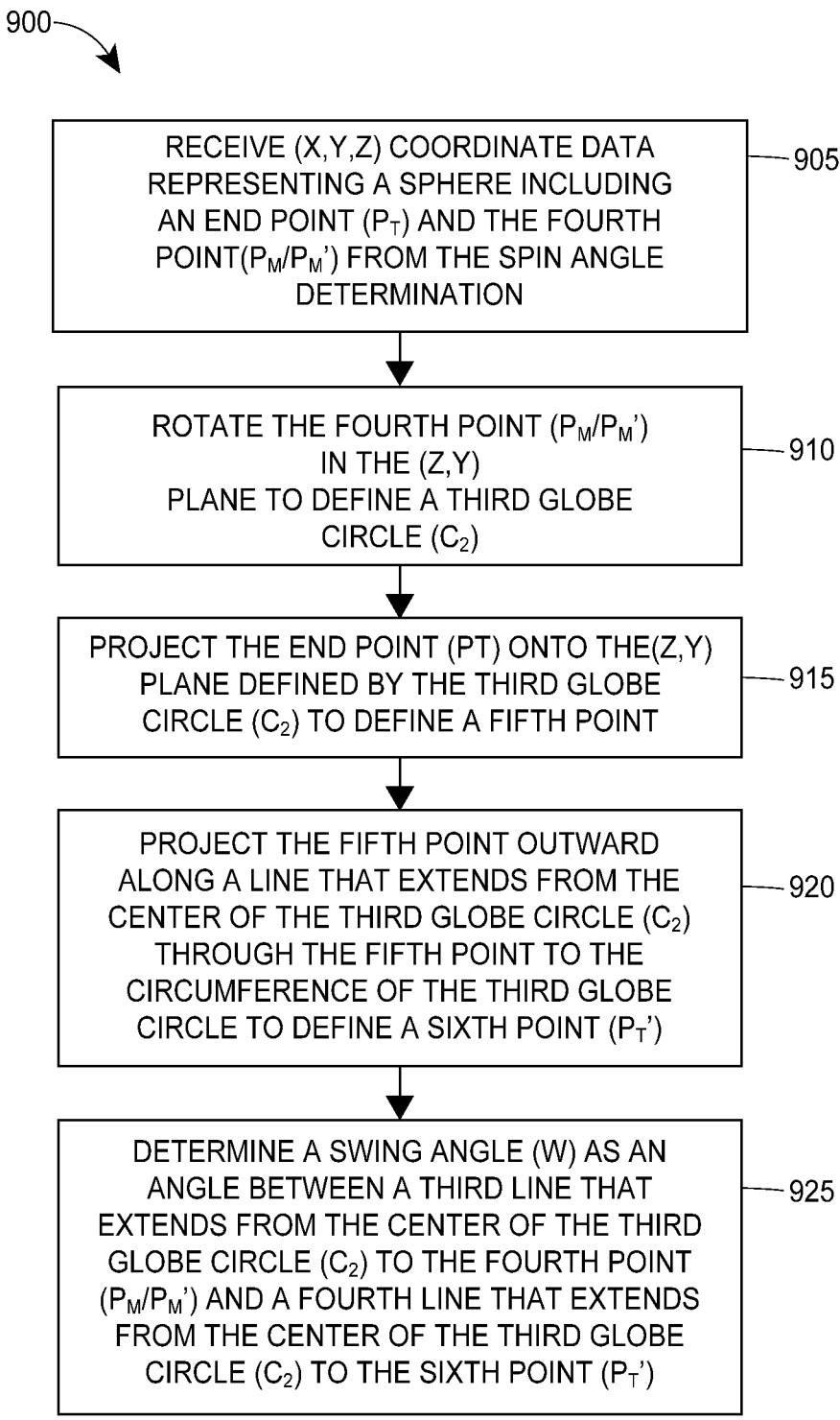
FIG. 9 depicts a flow diagram for a method of calculating a swing angle for revolving a sphere around a swing-axis.
Figure 10A:
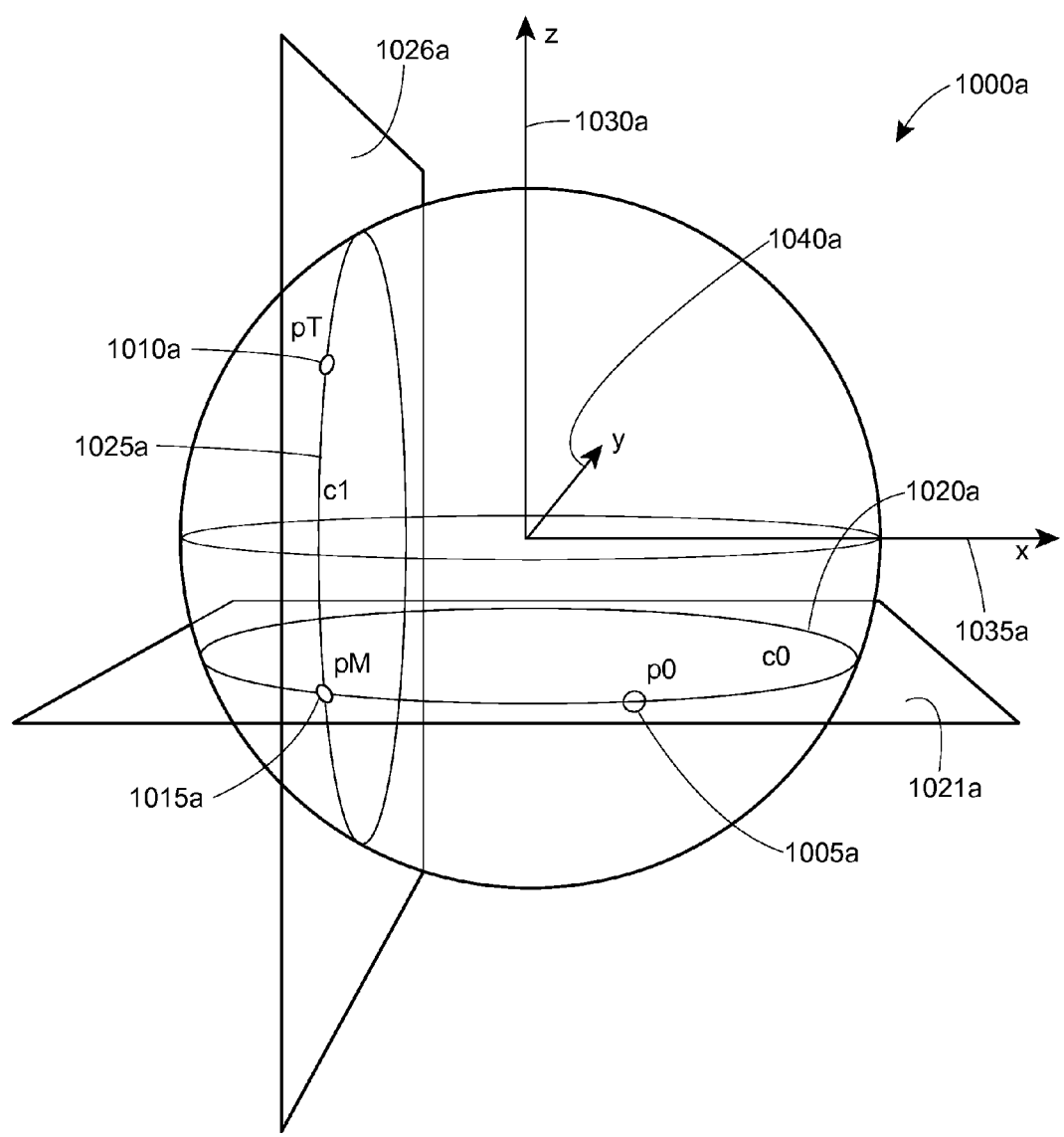
FIGS. 10A-10G depict a detailed example of determining a spin angle and a swing angle.

FIGS. 10A-10G, illustrate the determination of calculating a spin angle and a swing angle (e.g., method 700 of FIG. 7 or methods 800 and 900 of FIGS. 8 and 9, respectively) in conjunction with a series of spheres 1000a-1000g. As depicted in FIG. 10A, a sphere 1000a includes a first point 1005a, a second point 1010a and an intermediate point 1015a. The first point 1005a of FIG. 10A may correspond to the first point 130 of FIG. 1 or one of the first points 305a, 305b, 305c of FIGS. 3A-3C, respectively. The second point 1010a of FIG. 10A may correspond to the second point 135 of FIG. 1 or one of the second points 310a, 310b, 310c of FIGS. 3A-3C, respectively. The intermediate point 1015a of FIG. 10A may correspond to any one of the intermediate points 315a, 315b, 315c of FIGS. 3A-3C, respectively. The first point 1005a may correspond to a starting point (e.g., first point 130 of FIG. 1) and the second point 1010a may correspond to an ending point (e.g., second point 135 of FIG. 1) associated with navigating around a surface (e.g., surface 125 of FIG. 1) of a geographic coordinate system representation of a globe (e.g., earth 105).

In any event, a user of a mapping application may activate a pan function (e.g., horizontal pan feature 116 or vertical pan feature 117 of FIG. 1) to reposition the globe from the first point 1005a to the second point 1010a. In accordance with the above spin angle and swing angle computations, the sphere 1000a may be revolved around the spin-axis 1030a such that the sphere 1000a is moved from the first point 1005a to the intermediate point 1015a. After rotating the sphere 1000a around the spin-axis 1030a, the sphere 1000a may be revolved around the swing-axis 1035a such that the sphere 1000a is moved from the intermediate point 1015a to the ending point 1010a. Alternatively, the sphere 1000a may be moved from the beginning point 1005a to the ending point 1010a by revolving the sphere 1000a around the swing-axis 1035a first and subsequently revolved around the spin-axis 1030a. As shown in FIG. 10A, the beginning point 1005a may be revolved around the spin-axis 1030a relative to a first globe circle 1020a in the x-y plane 1021a. The intermediate point 1015a may be revolved around the swing-axis 1035a relative to a second globe circle 1025a in the y-z plane 1026a. The user may revolve the sphere 1000a around the rotate-axis 1040a using a compass rotate feature (e.g., compass rotate feature 113, 118, 119 of FIG. 1). The elements of FIGS. 10B-10G that correspond to elements of FIG. 10A are identified by the same number followed by a letter (b)-(g), respectively.

Figure 10B:
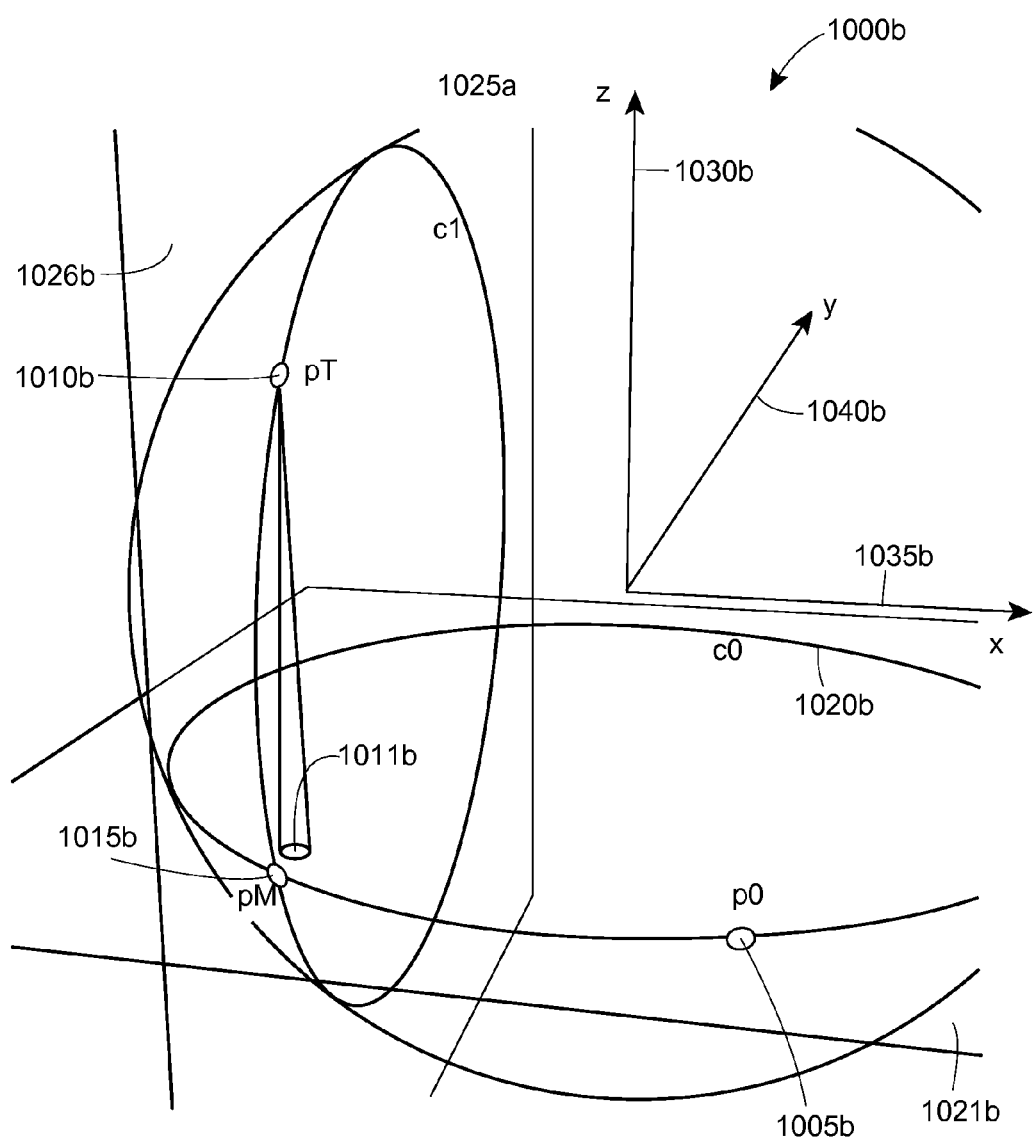
Figure 10C:
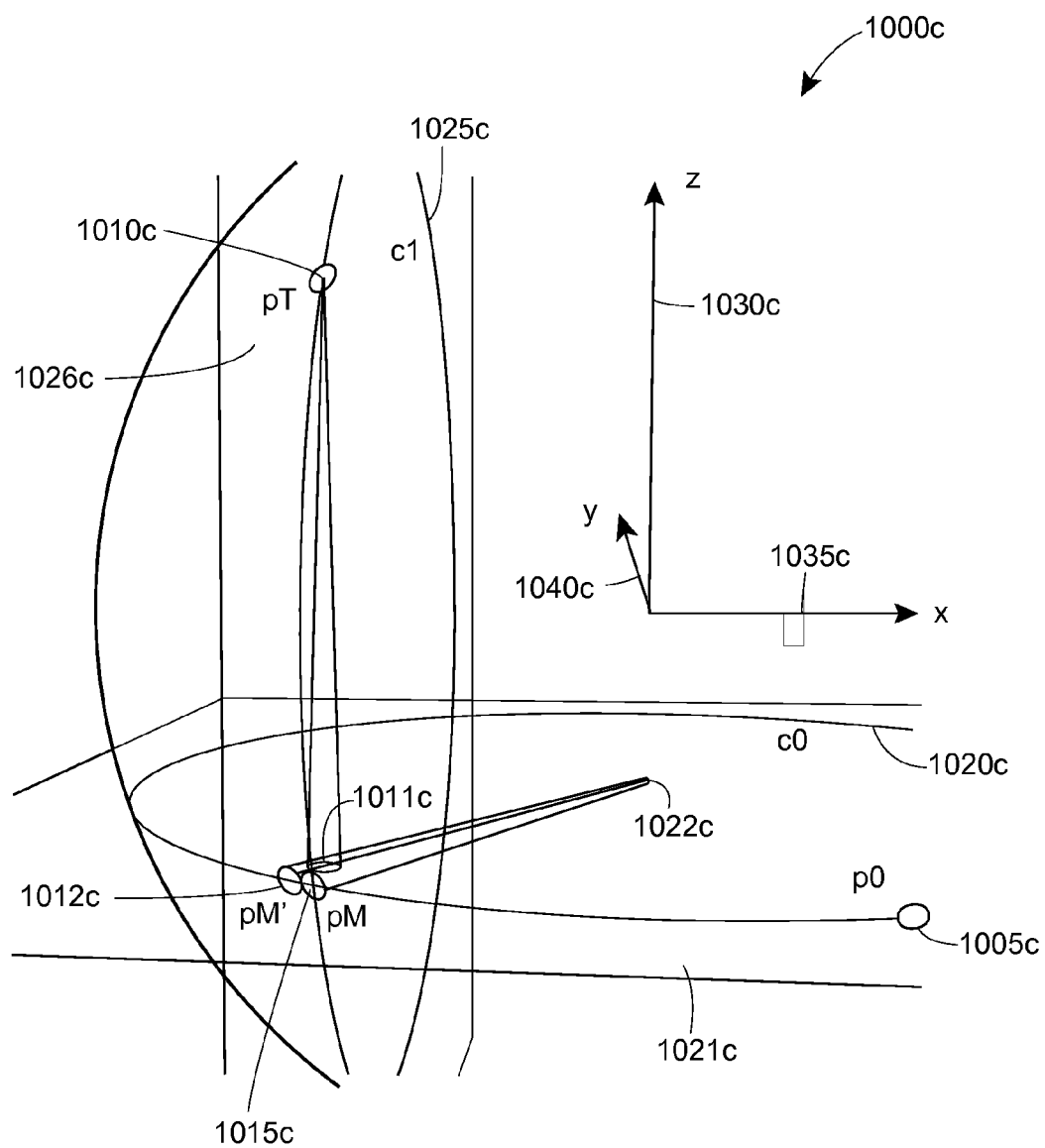
Figure 10D:
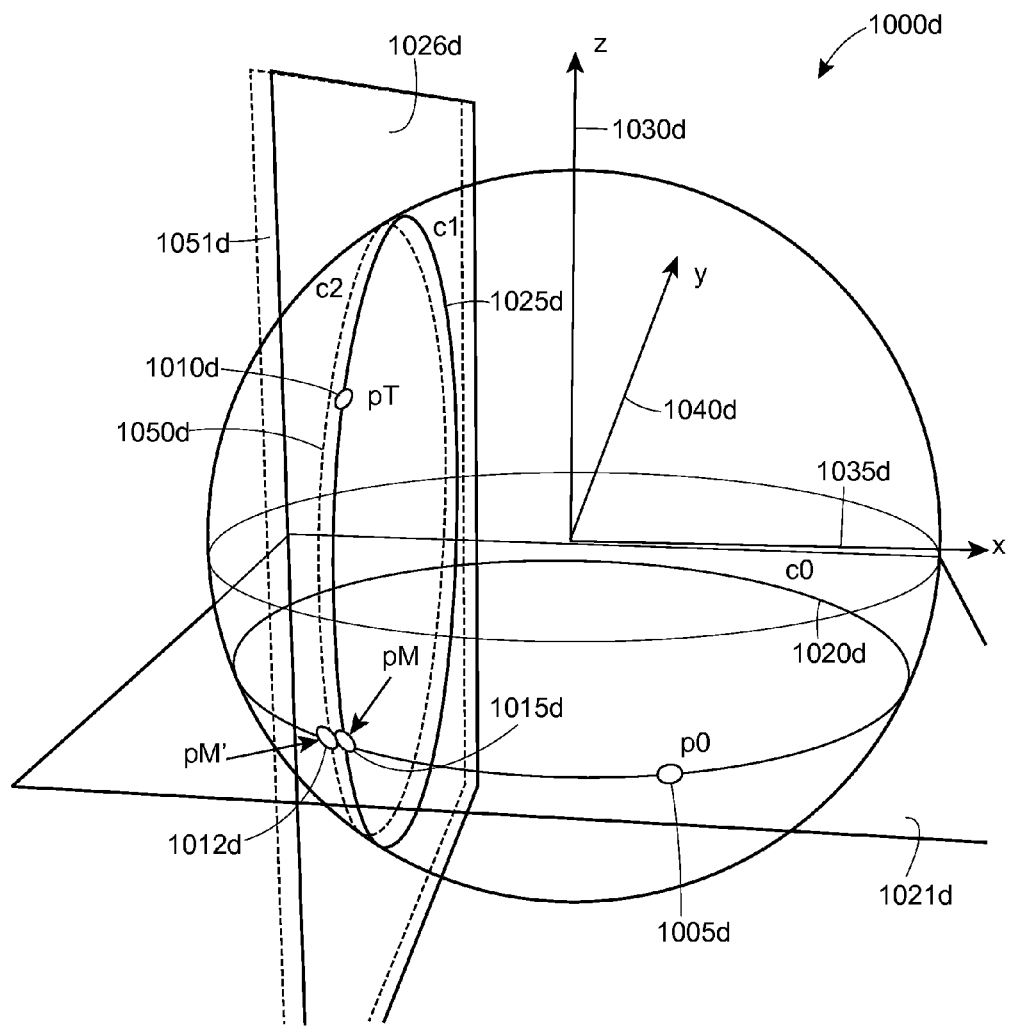
Figure 10E:
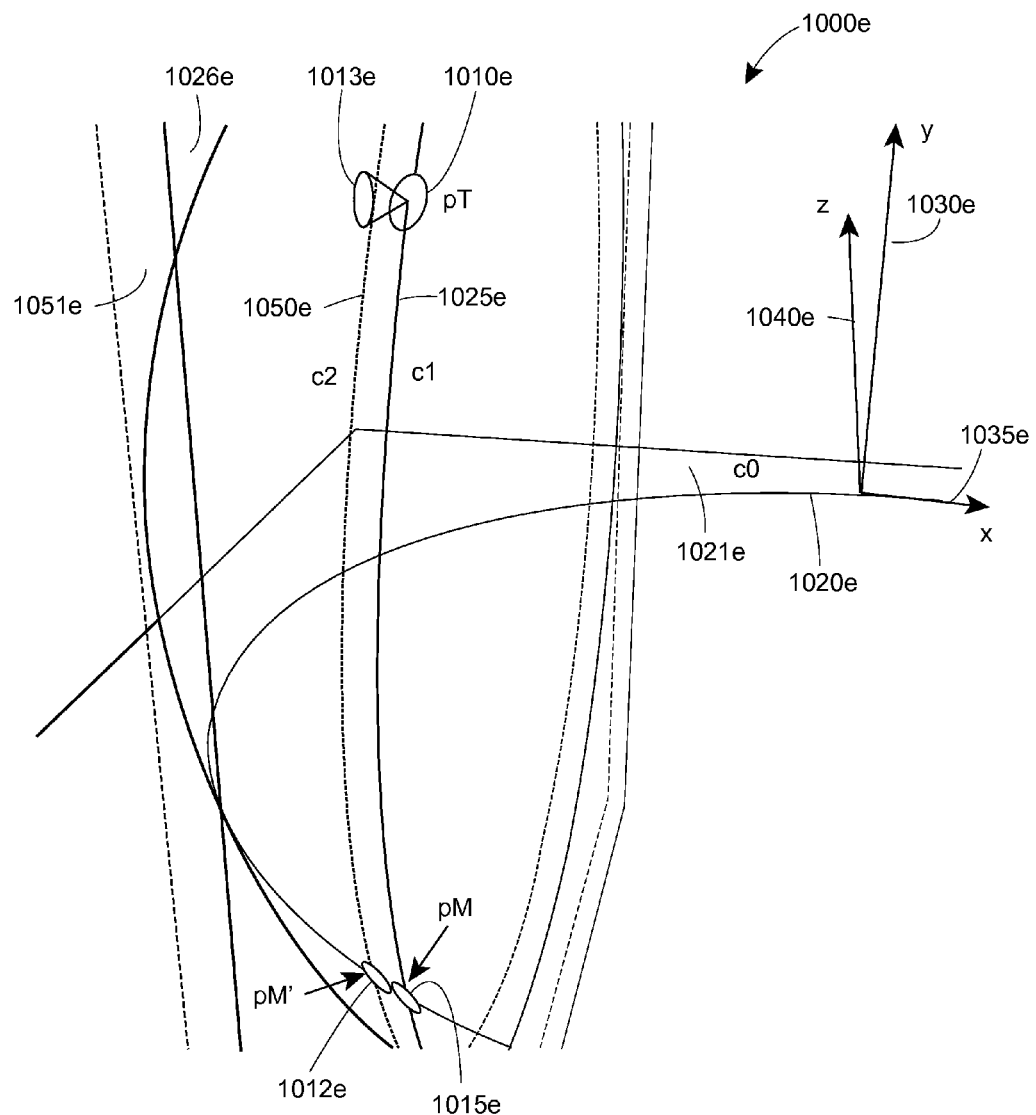
Figure 10F:
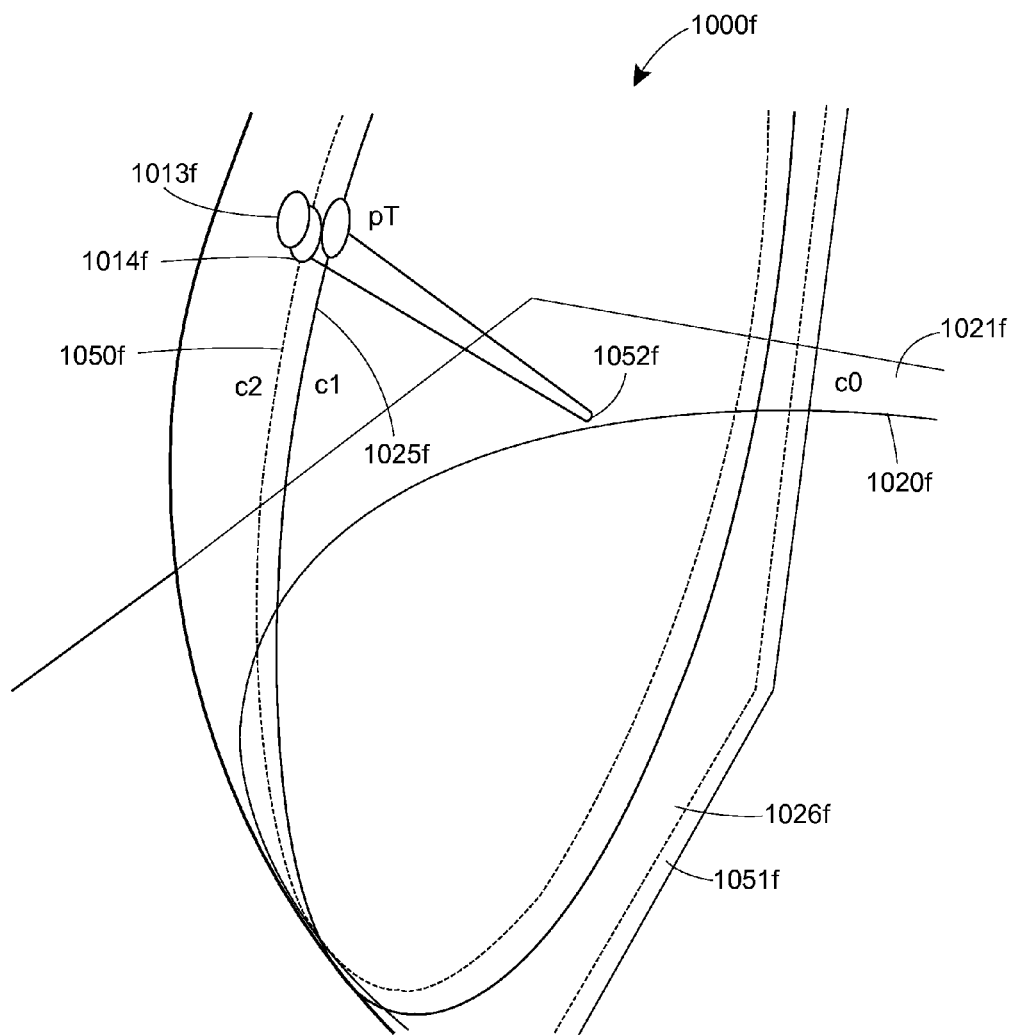

With reference to FIG. 10B, the method 800 of computing a spin angle may begin with the processor 430 retrieving, from the Earth/sphere database 485 of FIG. 4, (x, y, z) coordinate data representative of a sphere (e.g., data 640 of FIG. 6) including a starting point ($p_0$) (e.g., first point 130 of FIG. 1) and an ending point ($p_T$) (e.g., second point 135 of FIG. 1) (block 805 of FIG. 8). The processor 430 may then rotate the start point (e.g., first point 130 of FIG. 1) in an (x, y) plane (e.g., x, y plane 1021b of FIG. 10B) to define a first globe circle (e.g., circle 1020b of FIG. 10B) (block 810 of FIG. 8). The processor may then project the ending point (e.g., second point 1010b of FIG. 10B) onto the x-y plane (e.g., x-y plane 1021b of FIG. 10B) to define a third point (e.g., third point 1011b of FIG. 10B) (block 815 of FIG. 8). With reference to FIG. 10C, the processor 430 may then project the third point (e.g., third point 1011c of FIG. 10C) outward along a line extending from the center 1022c of the first globe circle 1020c through the third point (e.g., third point 10011c of FIG. 10C) to the circumference of the first globe circle (e.g., first globe circle 1020c of FIG. 10C) to define a fourth point (e.g., fourth point 1012c of FIG. 10C) intersecting the circumference of the first globe circle (e.g., first globe circle 1020c of FIG. 10C) (block 820 of FIG. 8).

Figure 10G:
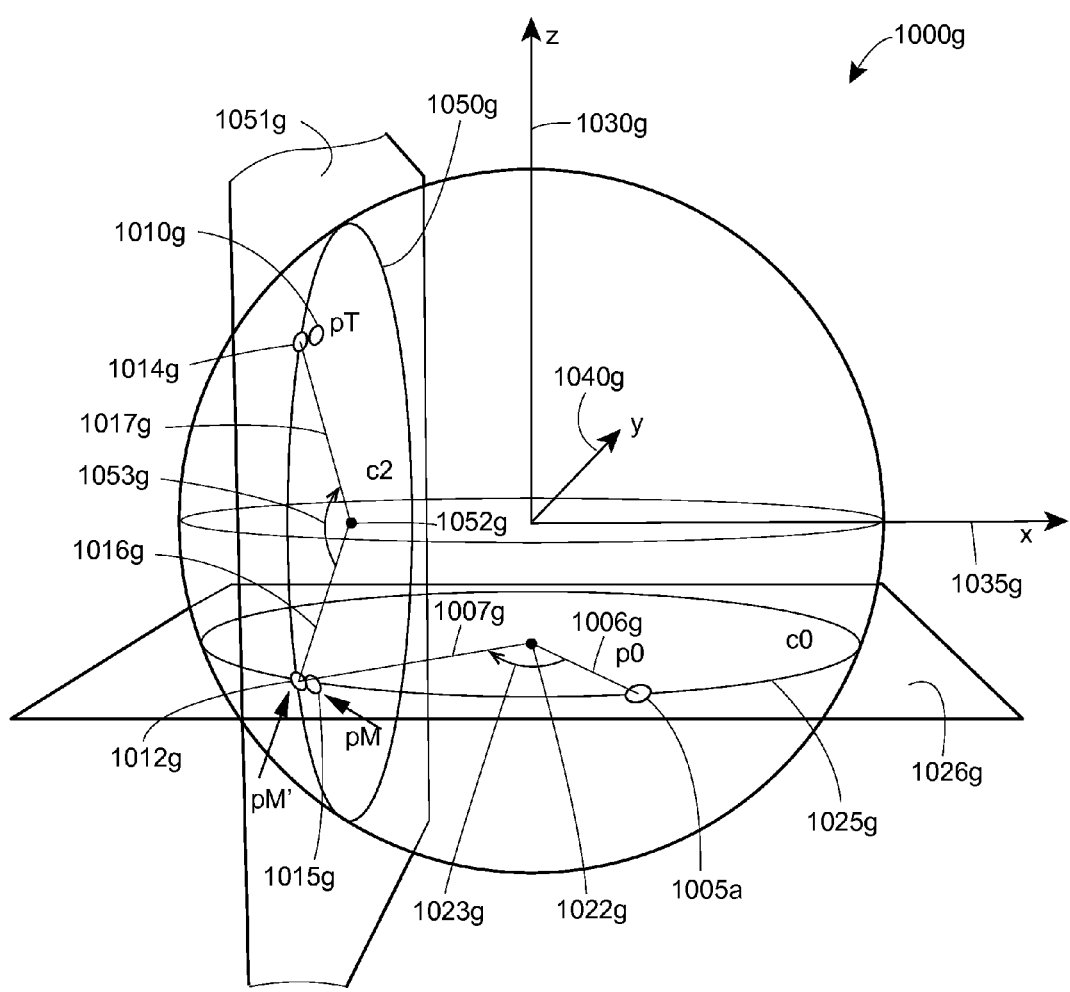

With reference to FIG. 10G, the process 430 may then determine the spin angle (e.g., spin angle 1023g of 10G) as an angle between a first line (e.g., first line 1006g of FIG. 10G) that extends from the center 1022g of the first globe circle 1025g to the first point 1005g and a second line (e.g., second line 1007g of FIG. 10G) that extends from the center 1022g of the first globe circle 1025g and the fourth point 1012g (block 825 of FIG. 8). Equations 1-4, from above, may represent a mathematical manifestation of the method 800 of FIG. 8.

Turning now to FIG. 9, a flow diagram depicts a method 900 of computing a swing angle. The method 900 may be implemented within any suitable computing device, such as either of the client devices 410, 500 of FIG. 4 and FIG. 5, respectively or computing device 405 of FIG. 4. It should be understood that the modules 425, 460 of FIG. 4 or the module 520 of FIG. 5 may be executed by a processor, similar to processors 430, 465, to implement the method 900. While the module 520 may be executed by either processor 430, 465 to implement the method 900, execution by the processor 430 will be described herein. The method 900 of computing a swing angle will be described in conjunction with further reference to FIGS. 10D-10G.

The processor 430 may retrieve, from the Earth/sphere database 485 of FIG. 4, (x, y, z) coordinate data representative of a sphere (e.g., data 640 of FIG. 6) including an end point (e.g., second point 1010d of FIG. 10D) and the fourth point (e.g., fourth point 1012c of FIG. 10C) from the spin angle determination (block 905 of FIG. 9). The processor 430 may then rotate the fourth point (e.g., fourth point 1012c of FIG. 10C) in the (z, y) plane (e.g., z, y plane 1051d of FIG. 10D) to define a third globe circle (e.g., third globe circle 1050d of FIG. 10D) (block 910 of FIG. 9). The process 430 may then project the end point (e.g., end point 1010e of FIG. 10E) onto the (z, y) plane (e.g., z, y plane 1051d of FIG. 10D) to define a fifth point (e.g., fifth point 1013e of FIG. 10E) (block 915 of FIG. 9). The processor 430 may then project the fifth point (e.g., fifth point 1013f of FIG. 10F) outward along a line that extends from the center of the third globe circle (e.g., third globe circle 1050f of FIG. 10F) through the fifth point (e.g., fifth point 1013f of FIG. 10F) to the circumference of the third globe circle (e.g., third globe circle 1050*f* of FIG. 10F) to define a sixth point (e.g., sixth point 1014*f* of FIG. 10F) (block 920 of FIG. 9).

The processor 430 may then determine a swing angle (e.g., swing angle 1053*g* of FIG. 10G) as an angle between a third line (e.g., third line 1016*g* of FIG. 10G) that extends from the center 1052*g* of the third globe circle 1050*g* to the fourth point 1012*g* and a fourth line (e.g., fourth line 1017*g* of FIG. 10G) that extends from the center 1052*g* of the third globe circle 1050*g* and the sixth point 1014*g* (block 925 of FIG. 9). Equations 5-12, from above, represent a mathematical manifestation of the method 900 of FIG. 9.

In another embodiment, the steps described with regard to FIGS. 10A-10G may begin with determining a swing angle followed by determining a spin angle. Correspondingly, the progression begins with projection of the point 1005*b* onto the plane 1026*b*. In this embodiment, the circle 1050*d* and the plane 1051*d* is parallel with the circle 1020*d* and the plane 1021*d* as opposed to being parallel to the circle 1025*d* and plane 1026*d*.

Figure 11:
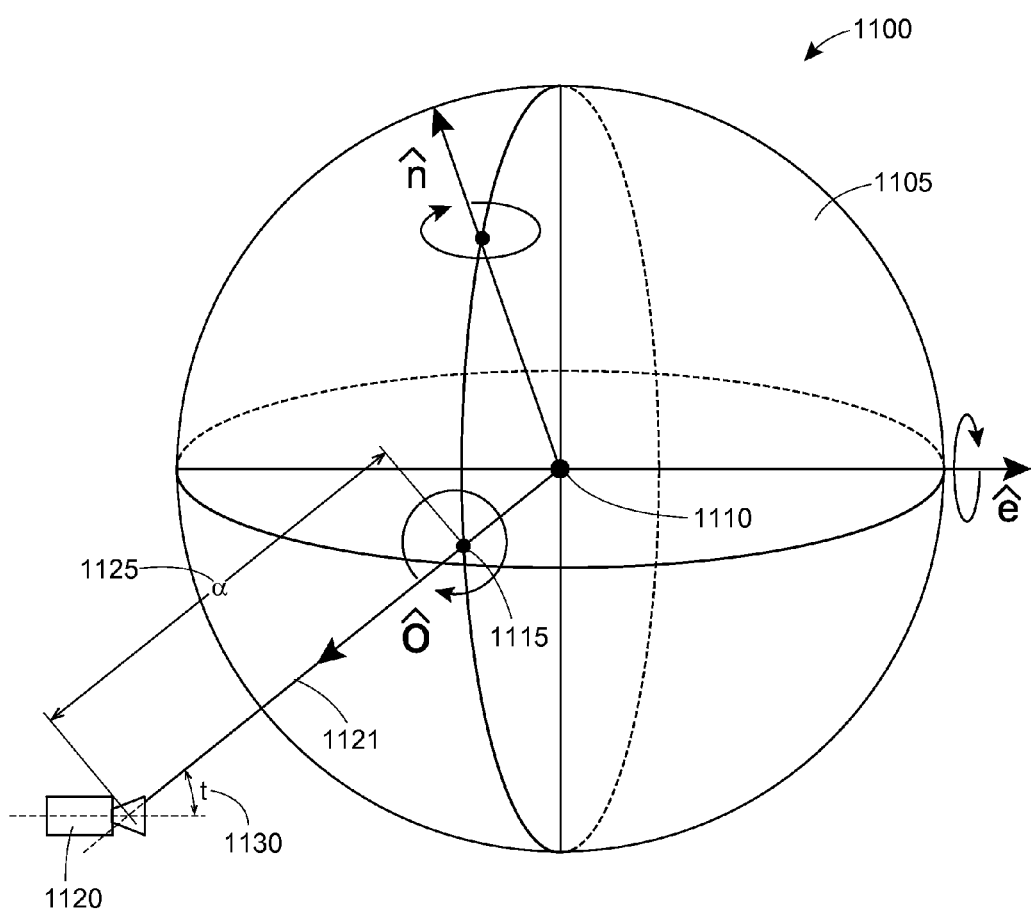
FIG. 11 depicts an example of determining a camera altitude and a first example of determining a camera tilt angle.

Turning to FIG. 11, a camera 1120 altitude 1125 is maintained relative to terrain 1115 associated with the surface 1105 of the Earth 1100 while a user navigates around the surface 1105. A processor (e.g., processor 430 of FIG. 4) may execute a camera altitude computation module (e.g., camera altitude computation module 525 of FIG. 5) to determine the camera 1120 altitude 1125. The process 430 may determine the camera 1120 altitude 1125 without reference to buildings, landmarks and other objects located on the surface 1105 of the Earth 1100. When the processor 430 determines the camera 1120 altitude 1125 without reference to buildings, landmarks and other objects located on the surface 1105 of the Earth 1100, navigation may be limited to values greater than or equal to certain values that form a minimum isosurface to define a "safety envelope". Thereby, "collision" between the camera 1120 and any object that is located on the surface 1105 is avoided. Alternatively, the processor 430 may determine a camera 1120 altitude 1125 with reference to buildings, landmarks and other objects located on the surface 1105 of the Earth 1100. The camera altitude computation module 525 may implement a function that smoothly maintains the camera 1120 altitude 1125 following the terrain 1115 by defining the surface 1105 of the Earth 1100 as a cubic higher-order surface (e.g., Bezier, Hermite or Catmull-Clark) relative to discrete regular samples. The camera altitude computation module 525 may be based on a spacing of altitude samples that represent a multi-resolution scheme where the distance between one sample and the next is about 128 pixels. When a new geometry level of detail for a geographic map (e.g., data 610, 615, 620 of FIG. 6) is displayed, the processor 430 may not change the camera 1120 altitude 1125. Rather, the camera 1120 altitude 1125 may travel relative to a new isosurface that passes through the camera 1120. A camera 1120 viewing axis 1121 may be aligned generally perpendicular relative to a smoothly varying surface within a field of view of the camera 1120. Panning around the geographic map may equate to navigation along the isosurface associated with a camera 1120 field of view. As new map data (e.g., data 610, 615, 620 of FIG. 6) comes in for camera 1120 altitude 1125 samples, the distance field described above may change. When the camera 1120 altitude 1125 is not in conflict with a lower bound (i.e., an altitude associated with a tallest object that is projecting from the surface 1105), the processor 430 may keep the camera 1120 altitude 1125 unchanged. When the camera 1120 altitude 1125 is in conflict with a lower bound, the processor 430 may gradually add a delta to the camera 1120 altitude 1125 delta such that the camera 1120 altitude 1125 change is not perceivable to a user. The processor 430 may implement camera 1120 collision avoidance to account for buildings, landmarks and other objects located on the surface 1105 of the Earth 1100. The processor 430 may achieve camera 1120 collision avoidance with respect to any objects projecting from the surface 1105 or the terrain associated with the surface 1105 by periodically sampling heights of objects currently displayed within a map viewport while a user navigates around a geographic map associated with the surface 1105 of the Earth 1125.

Figure 12:
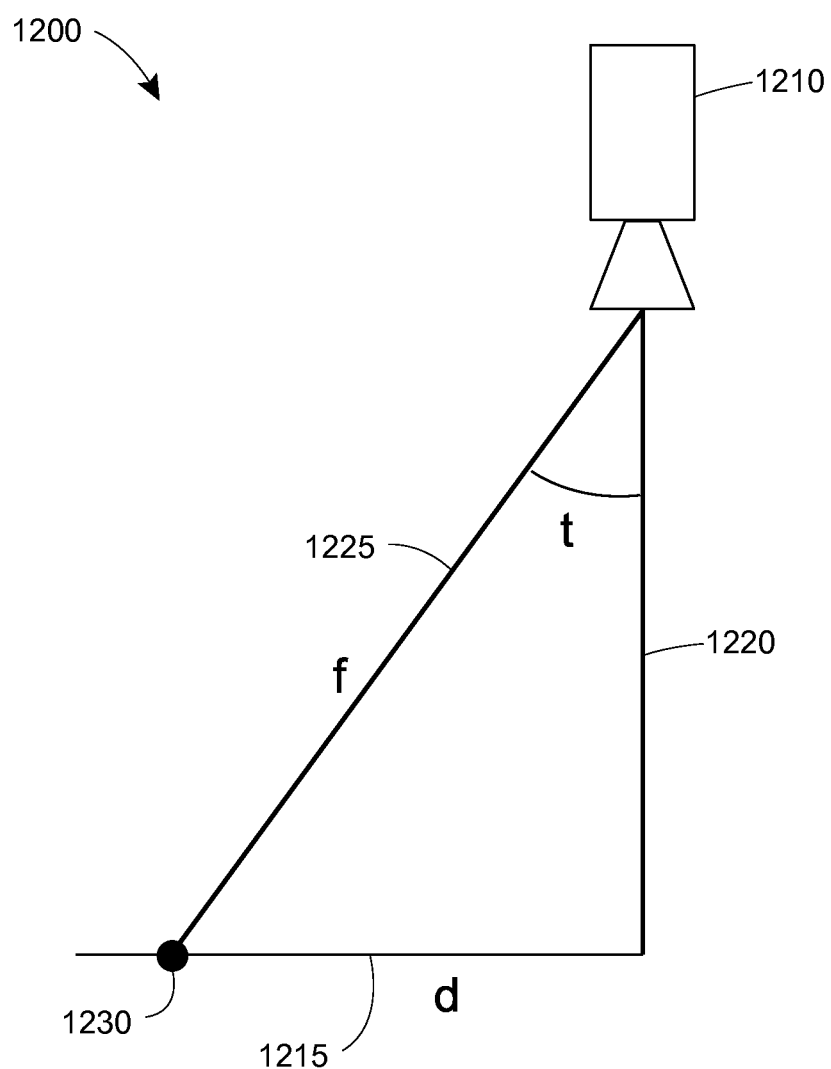
FIG. 12 depicts a second example of determining a camera tilt angle.

With further reference to FIG. 11 and with additional reference to FIG. 12, the relationship between a camera 1120, 1210 tilt angle t (1130, 1205), the altitude a (1125, 1220), and the distance 1215 to the target point d (1230) is defined. A processor (e.g., processor 430 of FIG. 4) may execute a camera tilt angle computation module (e.g., camera tilt computation module 530 of FIG. 5) to determine a camera 1120, 1210 tilt angle 1130, 1205. It is desirable to avoid giving a user the perception of moving the camera 1120, 1210 further away from the target point 1230 as the altitude 1125, 1220 is changed (i.e., it is desirable to have f (1225) decrease as a (1125, 1220) decreases):

$$f = a/\cos(t) \qquad \text{Equation 13:}$$

The camera tilt angle computation module 530 may implement a linear function to compute a tilt angle 1130, 1205 based on the altitude 1125, 1220 when the maximum tilt angle 1130, 1205 is 45 degrees or less. However, when the camera 1120, 1210 tilt angle 1130, 1205 is greater than 45 degrees, the camera 1120, 1210 does not appear to move closer to the target point during some of the zoom animation using a linear function. In other words, the camera 1120, 1210 altitude 1125, 1220 does not decrease fast enough when using a linear function while the camera 1120, 1210 tilt angle 1130, 1205 is greater than 45 degrees. As an alternative to providing auto-tilt behavior for the camera 1120, 1210 by directly defining a tilt angle 1130, 1205 for specific altitude 1125, 1220, the processor 430 may define a camera 1120, 1210 altitude 1125, 1220 relative to the target point 1230 and compute the tilt angle 1130, 1205 based on the camera 1120, 1210 altitude 1125, 1220. Mathematical conditions to ensure that the camera 1120, 1210 is getting closer to the target point 1230 are defined with reference to equation 16 (i.e., f decreases when a decreases and vice-versa):

$$df/da = (1 + a \tan(t) dt/da)/\cos(t) \qquad \text{Equation 14:}$$

Where: df/da>0,
df/da=(1+a tan(t)dt/da)/cos(t)>0
1+a tan(t)dt/da>0

$$dt/da > -1/(a \tan(t)) \qquad \text{Equation 15:}$$

Where: tan(t)>0, for 0>t>90 and a>0)
dt/da<0, to make sure that t increases as a decreases As a user of a mapping application navigates around the surface (e.g., surface 125 of FIG. 1) of a globe (e.g., Earth 105 of FIG. 1) that is represented by a sphere (e.g. sphere 200 of FIG. 2), a processor (e.g., processor 430) may transform the vertices that define the surface 125 of the globe 105 and objects located on the surface 125 by mathematically manipulating the following sequence of matrices to produce a total vertex transformation (M):

$$M = R_t T_a R_c R_w R_s \qquad \text{Equation 16:}$$

Where: $R_c$ is a compass rotation matrix,
$R_s$ is a spin rotation matrix,
$R_w$ is a swing rotation matrix,
$T_a$ is an altitude translation matrix, and $R_t$ is a tilt rotation matrix.

When the vertices that define the surface 125 of the globe 105 and the objects located on the surface 125 are transformed using the matrices defined above, each vertex is repositioned in accordance with the spin angle, the swing angle and the rotate angle computed above. The compass rotation matrix ($R_c$), the swing rotation matrix ($R_w$) and the spin rotation matrix ($R_s$) are sufficient for describing all possible orientations of the globe 105, therefore, these three matrices define a globe rotations matrix (G):

$$G = R_c R_w R_s \quad \text{Equation 17:}$$

All compass rotations are restricted to the compass rotation matrix $R_c$, which means that the swing rotation matrix ($R_w$) and the spin rotation matrix ($R_s$) are sufficient for describing all orientations of the globe 105 that are possible without changing the compass directions. The other transformations taken together define a camera transformations matrix (C):

$$C = R_t T_a \quad \text{Equation 18:}$$

and the total vertex transformation matrix is:

$$M = CG \quad \text{Equation 19:}$$

Given a function R(â, x) which creates a rotation of angle x around an axis â, and a function T(v̂) which creates a translation of vector v̂, and using the coordinate system used in FIG. 2, a processor (e.g. processor 430) may compute the globe rotations matrix G by:

$$G = R([0,0,1],c)R([1,0,0],w)R([0,1,0],s), \quad \text{Equation 20:}$$

and may compute the camera transformation matrix C by:

$$C = R([1,0,0]),-t)T([0,0,-a]) \quad \text{Equation 21:}$$

Where: c, w, and s are the rotate, swing, and spin angles, and t and a are the tilt angle and altitude respectively.

As described in detail herein, rotation of a globe due to activation of a pan feature of a navigation interface may be independent of rotation of the globe due to activation of a rotate feature. As a result, a user of a mapping application may navigate between a first point on a surface of the globe to a second point on the surface of the globe by activating a pan feature while a North-South orientation of the globe remains fixed. Activation of the pan feature does not reorient the North-South orientation of the globe. The user may reorient the North-South orientation of the globe by activating a rotate feature.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of components, modules, or mechanisms. Modules may constitute either software modules or hardware modules. A hardware module is tangible unit capable of performing certain operations and may be configured or arranged in a certain manner. In example embodiments, one or more computer systems (e.g., a standalone, display or server computer system) or one or more hardware modules of a computer system (e.g., a processor or a group of processors) may be configured by software (e.g., an application or application portion) as a hardware module that operates to perform certain operations as described herein.

In various embodiments, a module may be implemented mechanically or electronically. For example, a module may comprise dedicated circuitry or logic that is permanently configured (e.g., as a special-purpose processor, such as a field programmable gate array (FPGA) or an application-specific integrated circuit (ASIC)) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods, modules and routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map editor system for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a method for navigating a globe with North locked. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method, the method comprising:
   rendering, by one or more computing devices, a display of a three-dimensional surface of a body within a two-dimensional viewport using three-dimensional coordinate system data, wherein the body surface is defined by data in the three-dimensional coordinate system having x, y, and z axes, and wherein the body includes a North pole and a South pole, a spin-axis that extends through a center of the body generally along the z-axis, and a swing-axis that extends generally along the x-axis through the center of the body perpendicular to the spin-axis and parallel to a plane defined by the viewport;
   causing, by the one or more computing devices, the rendered body to move within the viewport between a current point on the body surface and a desired map point on the body surface using the three-dimensional coordinate system data by:
   determining, by the one or more computing devices, an intermediate point associated with the body;
   moving, by the one or more computing devices, the rendered body within the viewport along at least one of a determined spin-axis angle of revolution or a determined swing-axis angle of revolution, wherein the spin-axis angle of revolution comprises an angle of revolution around the spin-axis between the current point and the intermediate point around a first body circle, and wherein the swing-axis angle comprises an angle of revolution around the swing-axis between the intermediate point and the desired point around a second body circle;

wherein moving the body within the viewport between the current point and the desired point does not change an orientation of the North pole of the rendered body within the viewport; and wherein the intermediate point comprises a point on the body at which the first body circle and the second body circle intersect.

2. The computer-implemented method of claim 1, Wherein the body further includes a rotate-axis that extends generally along the y-axis through the center of the body perpendicular to the plane defined by the viewport and movement of the body within the viewport between the current point and the desired point does not move the body along the rotate-axis.

3. The computer-implemented method of claim 1 further comprising determining, by the one or more computing devices, a camera tilt angle with respect to a point on the surface of the body.

4. The computer-implemented method of claim 3, further comprising changing, by the one or more computing devices, the camera tilt angle based at least in part on a user input.

5. The computer-implemented method of claim 1 further comprising determining, by the one or more computing devices, a camera altitude with respect to a point on the surface of the body.

6. The computer-implemented method of claim 1, wherein the body comprises a sphere.

7. The computer-implemented method of claim 1, wherein the desired map point is identified based at least in part on a user input.

8. A computing device comprising:
a cursor control device having a user input mechanism, wherein activation of the cursor control device and the input mechanism causes a processor to execute a body surface panning module;
a display generation module stored on a non-transitory computer readable medium that, when executed by one or more processors, renders a display of a surface of a body in a two-dimensional viewport using three-dimensional coordinate system data, wherein the body surface is defined by the three-dimensional coordinate system data having x, y, and z axes, and wherein the body includes a North pole and a South pole, a spin-axis that extends through a center of the body generally along the z-axis, and a swing-axis that extends generally along the x-axis through the center of the body perpendicular to the spin-axis and parallel to a plane defined by the viewport;
wherein the body surface panning module is stored on a non-transitory computer readable medium that, when executed by one or more processors, causes the rendered body to move within the viewport between a current point on the body surface and a desired point on the body surface using the three-dimensional coordinate system data by:
determining an intermediate point associated with the body surface;
moving the rendered body within the viewport along at least one of a determined spin-axis angle of revolution or a determined swing-axis angle of revolution, wherein the spin-axis angle of revolution comprises an angle of revolution around the spin-axis between the current point and the intermediate point around a first body circle, and wherein the swing-axis angle of revolution comprises an angle of revolution around the swing-axis between the intermediate point and the desired point around a second body circle;

wherein moving the body within the viewport between the current point and the desired point does not change an orientation of the North pole of the rendered body within the viewport; and wherein the intermediate point comprises a point on the body at which the first body circle and the second body circle intersect.

9. The computing device of claim 8, wherein the body further includes a rotate-axis that extends along the y-axis through the center of the body perpendicular to the plane defined by the viewport and movement of the body within the viewport between the current point and the desired point does not move the body along the rotate-axis.

10. The computing device of claim 8, further comprising an altitude computation module stored on a non-transitory computer readable medium that, when executed by a processor, calculates a camera altitude.

11. The computing device of claim 8, further comprising a camera tilt angle computation module stored on a non-transitory computer readable medium that, when executed by a processor, calculates a camera tilt angle.

12. The computing device of claim 8, wherein the body comprises a sphere.

13. One or more tangible, non-transitory computer-readable, media storing computer-readable instructions that when executed by one or more processors cause the one or more processors to perform operations, the one or more tangible, non-transitory computer-readable media comprising:
a display generation module that, when executed by one or more processors, renders a display of a surface of a body in a two-dimensional viewport using three-dimensional coordinate system data, the body surface including the three-dimensional coordinate system data having x, y, and z axes, wherein the body includes a North pole and a South pole, a spin-axis that extends through a center of the body along the z-axis between the North pole and the South pole, and a swing-axis that extends along the x-axis through the center of the body perpendicular to the spin-axis and parallel to a plane defined by the viewport;
a body surface panning feature module that, when executed by the one or more processors, causes the rendered body to move within the viewport between a current point on the body surface and a desired point on the body surface using the three-dimensional coordinate system data by:
determining an intermediate point on the body surface; and
moving the rendered body within the viewport along at least one of a determined spin-axis angle of revolution or a determined swing-axis angle of revolution, the spin-axis angle of revolution comprising an angle of revolution around the spin-axis between the current point and the intermediate point around a first body circle, and the swing-axis angle of revolution comprising an angle of revolution around the swing-axis between the intermediate point and the desired point around a second body circle;
wherein movement of the body within the viewport between the current point and the desired point does not change an orientation of the North pole of the rendered body within the viewport; and wherein the intermediate point comprises a point on the body at which the first body circle and the second body circle intersect.

14. The one or more tangible, non-transitory computer-readable media of claim 13, wherein the body further includes a rotate-axis that extends along the y-axis through the center of the body perpendicular to the plane defined by the viewport and movement of the body within the viewport between the current point and the desired point does not move the body along the rotate-axis.

15. The one or more tangible, non-transitory computer-readable media of claim 13, further comprising an altitude computation module that, when executed by the one or more processors, calculates a camera altitude.

16. The one or more tangible, non-transitory computer-readable media of claim 13, further comprising a camera tilt angle computation module, when executed by the one or more processors, calculates a camera tilt angle.

* * * * *